(12) United States Patent
Baker et al.

(10) Patent No.: US 10,694,608 B2
(45) Date of Patent: Jun. 23, 2020

(54) AUDIO-BASED LOAD CONTROL SYSTEM

(71) Applicant: Lutron Technology Company LLC, Coopersburg, PA (US)

(72) Inventors: Rhodes B. Baker, Allentown, PA (US); Matthew V. Harte, Stewartsville, PA (US); Jeffrey Karc, Danielsville, PA (US); Galen E. Knode, Macungie, PA (US); John B. Nill, Emmaus, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/891,079

(22) Filed: Feb. 7, 2018

(65) Prior Publication Data

US 2018/0228006 A1 Aug. 9, 2018

Related U.S. Application Data

(60) Provisional application No. 62/455,973, filed on Feb. 7, 2017.

(51) Int. Cl.
*H05B 37/02* (2006.01)
*H05B 47/12* (2020.01)
(Continued)

(52) U.S. Cl.
CPC .............. *H05B 47/12* (2020.01); *G10L 15/22* (2013.01); *G10L 15/30* (2013.01); *H05B 47/105* (2020.01);
(Continued)

(58) Field of Classification Search
CPC ............ H05B 37/0236; H05B 37/0227; H05B 37/0272; G10L 15/22; G10L 2015/228; G10L 15/223
See application file for complete search history.

(56) References Cited

U.S. PATENT DOCUMENTS 4,408,308 A 10/1983 Smith et al.
4,918,717 A 4/1990 Bissonnette et al.
(Continued)

FOREIGN PATENT DOCUMENTS

WO WO2016029156 A1 2/2016
WO WO2016074533 A1 5/2016

OTHER PUBLICATIONS

Vacher, M et al., The Sweet-Home speech and multimodal corpus for home automation interaction, Language Resources and Evaluation Conference Proceedings, 2014, European Language Resources Association, Reykjavik, Iceland.
(Continued)

*Primary Examiner* — Seokjin Kim
(74) *Attorney, Agent, or Firm* — Amy Yanek; Glen Farbanish; Philip Smith

(57) ABSTRACT

A scalable, distributed load control system for home automation based on a network of microphones may include control devices (e.g., load control devices) that may include microphones for monitoring the system and communicating audio data to a cloud server for processing. The control devices of the load control system may receive a single voice command and may be configured to choose one of the load control devices to transmit the voice command to the cloud server. The load control devices may be configured to receive a voice command, control a connected load according to the voice command if the voice command is a validated command, and transmit the voice command to a voice service in the cloud if the voice command is not a validated command. The voice service to which the load control devices transmit audio data to may be selectable.

9 Claims, 20 Drawing Sheets

(51) Int. Cl.
*G10L 15/30* (2013.01)
*G10L 15/22* (2006.01)
*H05B 47/19* (2020.01)
*H05B 47/105* (2020.01)

(52) U.S. Cl.
CPC ........ *H05B 47/19* (2020.01); *G10L 2015/223* (2013.01); *G10L 2015/228* (2013.01)

(56) References Cited

U.S. PATENT DOCUMENTS

| | | |
|---|---|---|
| 6,324,514 B2 | 11/2001 | Matulich et al. |
| 6,380,696 B1 | 4/2002 | Sembhi et al. |
| 6,594,630 B1 | 7/2003 | Zlokarnik et al. |
| 6,803,728 B2 | 10/2004 | Balasubramanium et al. |
| 7,024,256 B2 | 4/2006 | Zrzyzanowski et al. |
| 7,242,150 B2 | 7/2007 | DeJonge et al. |
| 7,535,796 B2 | 5/2009 | Holm et al. |
| 7,546,473 B2 | 6/2009 | Newman |
| 7,764,775 B2 | 7/2010 | Tarkoff et al. |
| 8,340,975 B1 | 12/2012 | Rosenberger |
| 8,664,881 B2 | 3/2014 | Newman, Jr. et al. |
| 8,983,798 B2 | 3/2015 | Han et al. |
| 8,984,338 B2 | 3/2015 | Cho et al. |
| 9,087,514 B2 | 7/2015 | Jonsson |
| 9,196,432 B1 | 11/2015 | O'Keeffe |
| 9,281,727 B1 | 3/2016 | Coley et al. |
| 9,293,134 B1 | 3/2016 | Saleem et al. |
| 9,299,350 B1 | 3/2016 | Dumont et al. |
| 9,337,943 B2 | 5/2016 | Mosebrook et al. |
| 9,495,955 B1 | 11/2016 | Weber et al. |
| 2008/0278007 A1 | 11/2008 | Moore |
| 2011/0206345 A1 | 8/2011 | Masuo |
| 2012/0224706 A1 | 9/2012 | Hwang et al. |
| 2013/0234625 A1 | 9/2013 | Kondo et al. |
| 2014/0327555 A1 | 11/2014 | Sager et al. |
| 2014/0376747 A1 | 12/2014 | Mullet et al. |
| 2015/0185751 A1 | 7/2015 | Karc et al. |
| 2016/0117905 A1 | 4/2016 | Powley |
| 2016/0125318 A1 | 5/2016 | Scoffier et al. |
| 2016/0232779 A1 | 8/2016 | Sloo et al. |
| 2016/0302725 A1 | 10/2016 | Schultz et al. |
| 2016/0323977 A1* | 11/2016 | Sun .................... H04L 12/2816 |
| 2017/0006378 A9 | 1/2017 | Yan et al. |
| 2017/0025124 A1* | 1/2017 | Mixter .................... G10L 15/32 |
| 2017/0069324 A1 | 3/2017 | Gardner et al. |
| 2017/0123390 A1 | 5/2017 | Barco et al. |

OTHER PUBLICATIONS

Vacher, et al., Complete Sound and Speech Recognition System for Health Smart Homes: Application to the Recognition of Activities of Daily Living, New Developments in Biomedical Engineering, In-Tech, 2010, pp. 645-673.

Kelly, Heather, The Home Security Device That's Always Listening, https://www.cnn.com/2014/11/20/tech/innovation/point-home-security/index.html, CNN, Nov. 24, 2014, 2 pp.

Integrating Amazon Alexa with RadioRA2 and HomeWorks QS, Lutron, Rev 1.0, Oct. 24, 2016, 13 pp.

Echo Alexa—Remote Microphones for the Whole House, https://community.smartthings.com/t/echo-alexa-remote-microphones-for-whole-house/24337, SmartThings Forum, Sep. 2015, accessed May 2018, 3 pp.

* cited by examiner

AUDIO-BASED LOAD CONTROL SYSTEM

CROSS-REFERENCE TO RELATED APPLICATIONS

This application claims the benefit of U.S. Provisional Patent Application No. 62/455,973, filed Feb. 7, 2017, the entire disclosure of which is incorporated by reference herein.

BACKGROUND

The ability to control devices audibly (e.g., vocally and/or verbally) is spurring a technological revolution in smart home control. Voice integration devices such as Amazon Echo or Google Home devices allow a user to vocally interact with a connected microphone/speaker device to control other devices in the home environment, or smart home network, through the use of a keyword (e.g., a wake word). For example, a user can integrate a voice integration device with a lighting control system to control the lights through a keyword (e.g., "Alexa") followed by a voice command (e.g., "turn on the living room light").

Current voice integration devices may be connected via a network to a server (e.g., a voice service) which performs voice recognition on the acoustic data of the voice command upon receiving the keyword. The connection may be wireless, such as a Wi-Fi enabled voice integration device, or hard-wired via an Ethernet cable to a user's Internet router. After the voice service has interpreted the acoustic data, the voice integration device can then send the interpreted data to one or more servers. The servers may communicate with a system controller which may command on more load control devices to control electrical loads based on the interpretation of the acoustic data. The voice integration device may also respond verbally to the user to provide acknowledgement that the voice command was received and/or give the user confirmation of the device command that was sent to the smart home network.

SUMMARY

There is great potential to expand on the capabilities of microphone devices for residential and commercial environments. Described herein is a scalable, distributed group of microphone devices for integration into home automation or load control systems comprising control devices (e.g., load control devices configured to control electrical loads). Although the microphone may be used in a standalone device, described herein are load control devices that may include microphones for monitoring the system and communicating measured data (e.g., audio data) to a server for processing. For example, the server may be an Internet server (i.e., a cloud server), or any type of server. The control devices of the load control system that include microphones may be referred to as microphone devices or control devices or load control devices. One will recognize however, that a microphone device need not necessarily be configured to control an electrical load.

A user may install one or more microphone devices to monitor the audio data (e.g., acoustic data), such as voice commands and ambient sounds, in the surrounding environment. The microphone devices may be configured to learn and/or detect sounds over time and make intelligent decisions based on the identified sounds. The decision making may alternatively be done remotely by a system controller or cloud server. The cloud server may have machine learning capabilities, whereby it takes passive inputs from microphone devices installed throughout the home and over time begins to associate them with activities. The system may also use other inputs or information in addition to the microphone devices, such as occupancy status from occupancy sensors, time of day, day of the week, inputs from the user confirming sounds or person identification, etc.

The control devices of the load control system may receive a single voice command and may be configured to choose one of the load control devices to transmit the voice command to a voice service in the cloud. For example, the load control devices may be configured to choose one of the load control devices by determining which load control device heard the voice command the best, or highest quality.

One or more of the load control devices of the load control system may be configured to receive a voice command and either process the voice command locally if the voice command is a validated command, or may transmit the voice command to a voice service in the cloud if the voice command is not a validated command. The load control device may also be configured to determine if the voice command should be stored locally to the device as a validated command in response to repeated receipt of the same voice command.

One or more of the load control devices of the load control system may be configured to receive a voice command, determine if the voice command includes zone information, control a connected electrical load, such as a lighting load, according to the voice command if the voice command did not include the zone information, and transmit a command to another load control device identified by the zone information if the voice command includes the zone information.

One or more of the load control devices of the load control system may be configured to receive a voice command, and communicate the voice command to a system controller. The system controller may determine from the received voice command(s) and possibly occupancy information a zone or area from the voice command(s) originated, and control one or more electrical loads, such as lighting loads, in the area based on the voice command.

The voice service to which the load control devices of the load control system transmit audio data by may be selectable. For example, the voice service may be selectable by a user through an application running on a processing device, such as a smart phone, tablet, laptop, or computer. In addition, the voice service may be dynamically selectable by the system.

The above advantages and features are of representative embodiments only. They are not to be considered limitations. Additional features and advantages of embodiments will become apparent in the following description, from the drawings, and from the claims.

DETAILED DESCRIPTION

Figure 1:
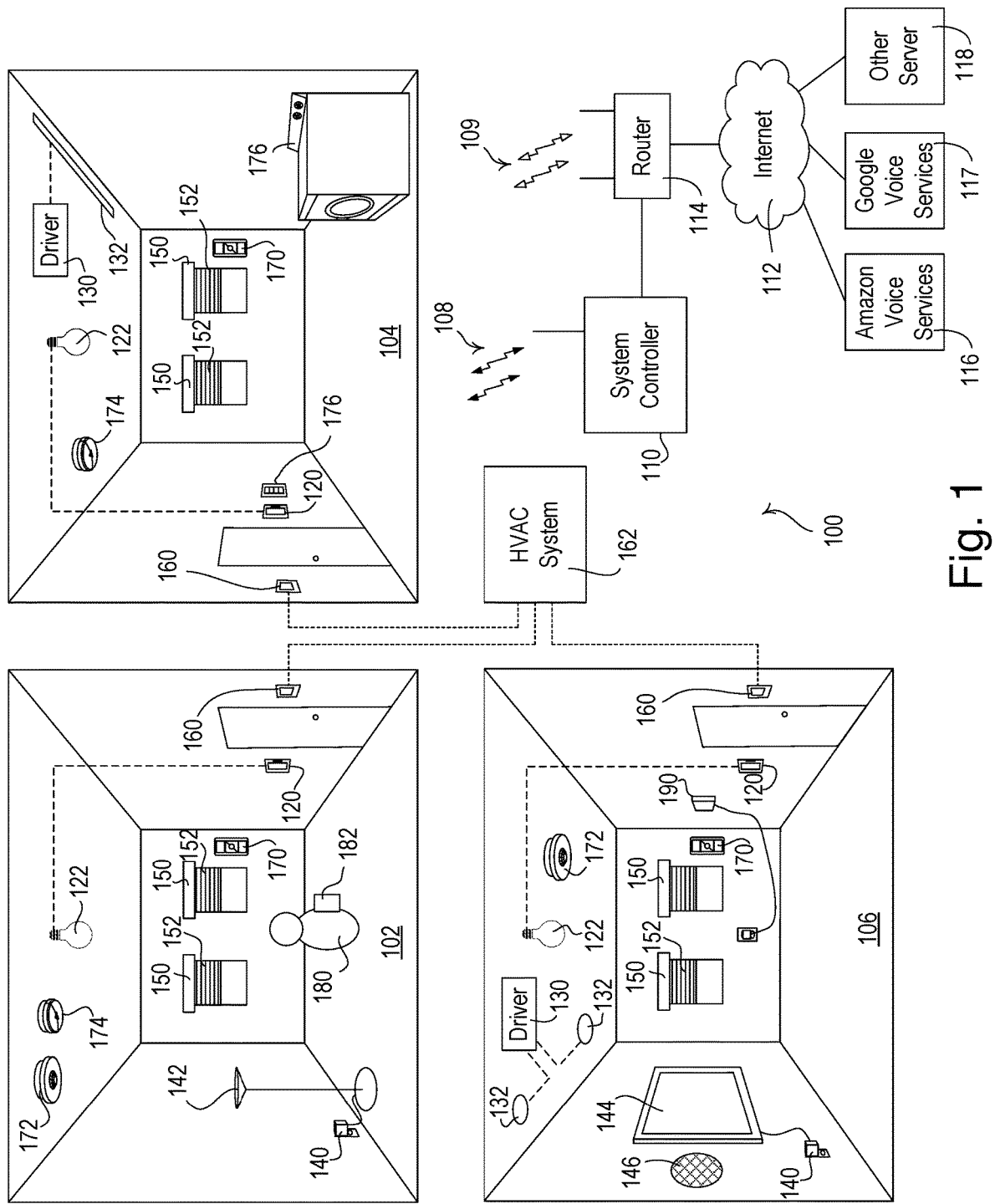
FIG. 1 shows an example load control system with microphone devices in an example user environment.

FIG. 1 is a simplified diagram of an example load control system 100. The load control system 100 may be installed in a building with rooms 102, 104, 106 as shown in FIG. 1. The load control system 100 may include load control devices, that is, devices configured to control one or more electrical loads. For example, load control system 100 may include wall-mounted lighting control devices 120 (e.g., dimmer switches), light-emitting diode (LED) drivers 130, motorized window treatments 150, thermostats 160, and plug-in load control devices 140. The load control devices may control loads within the system, such as a heating, ventilation, and air-conditioning (HVAC) system 162, lighting loads 122, 132, 142, an audio speaker 146, and other electrical devices, such as a television (TV) 144. In addition to toggle control (e.g., on/off control), the load control devices may also be configured to control a level of their respective loads. For example, the lighting control devices 120 and the LED drivers 130 may adjust the intensity level of the respective lighting loads 122, 132, 142; the motorized window treatments 150 may adjust the position level of the respective covering materials 152, and the thermostats 160 may provide temperature control of the HVAC system 162.

The load control system may include a system controller 110, which may be connected to the Internet 112 via a router 114. The system controller 110 may be connected to the router 114 via either a wired connection (e.g., an Ethernet communication link), or a wireless connection (e.g., a Wi-Fi communication link). Servers on the Internet may allow for additional remote cloud processing, data storage, etc. The system controller 110 may communicate with the devices in the load control system via wireless communication signals 108, which may use a standard wireless protocol (e.g., ZigBee, Wi-Fi, Z-Wave, Bluetooth, Li-Fi. etc.), or a proprietary protocol (e.g., ClearConnect). The wireless protocol that the system controller 110 uses to communicate with the devices in the load control system 100 may be the same as, or different from, the wireless protocol that the system controller uses to communicate with the router 114.

Although the system has been described as a wireless system, alternatively, a wired system for inter-device communication may be implemented (Power over Ethernet, power line communication, CAT5 cables, etc.). Or, the devices in the system may communicate wirelessly directly with the router 114 via Wi-Fi without the need for a system controller.

The load control system 100 may also include input devices, such as remote controls 170, occupancy sensors 172, daylight sensors 174, and a wall-mounted keypad 120. These input devices may transmit wireless communication signals 108 to other load control devices in the load control system, either directly or through the system controller 110.

The load control devices may be configured to control respective electrical loads in response to one or more inputs. For example, the load control device 120 may control electrical load 122 in response to a user actuation, such as a button press. For example, a user may press a button on the load control device 120 to control the electrical load 122. Additionally and/or alternatively, the load control devices may be responsive to input devices via the wireless communication signals 108. For example, the daylight sensor 174 may transmit wireless communication signals 108 containing information about the amount of light in room 102 to either the system controller 110 or the motorized window treatment 150, to change the level of the window covering 152. The occupancy sensor 172 may transmit wireless communication signals 108 including information regarding an occupancy status of the room in which the sensor resides to cause the respective lighting control device 120 to automatically turn on (or off) lighting load 122 based on the occupancy status. For example, a user 180 may enter room 102. The occupancy sensor 172 of room 102 may detect that a user (i.e., user 180) has entered room 102. In response to the occupancy detection, the occupancy sensor 172 may transmit an occupancy command to the load control device 120 and/or the system controller. In response to the occupancy command transmitted by the occupancy sensor, the system controller may then transmit the occupancy command to the load control device 120 and/or the load control device may receive the occupancy command from the occupancy sensor. In response to receiving the occupancy command, the load control device 120 may control the connected lighting load 122 by turning on the lighting load 122.

Additionally, an occupant 180 of the residence 100 may control the loads locally or remotely by transmitting messages to the load control device(s) from a network device 182 (e.g., a communication device), such as a smart phone or tablet. For example, the occupant 180 may press a button in a mobile application on the network device 182 to turn on the lighting load 122 in room 102. The network device 182 may send wireless commands to the system controller 110, and the system controller may send wireless communication signals 108 to the devices in the load control system 100, such as the lighting control device 120, to turn on the light 122. Alternatively, the network device 182 may communicate with the system controller via the Internet 112. For example, the system controller may be connected to the router 114 via an Ethernet connection, whereas the network device 182 may have a Wi-Fi or data connection to the Internet 112 and/or the router 114.

Additionally, any of the methods described previously for controlling a load control device may also be used to control multiple load control devices to create a scene. For example, a user may press a button on a load control device which may cause several load control devices to change the intensity of one or more lighting loads, adjust a motorized window treatment, etc. Examples of scene-based load control are described in more detail U.S. Pat. No. 6,803,728, issued Oct. 12, 2004, to Balasubramanium et al., entitled "System for control of devices", which is incorporated by reference herein. Load control systems which are responsive to system controllers are described in more detail by Donald Mosebrook et al. as broadcast controllers in U.S. Pat. No. 9,337,943, issued May 10, 2016, entitled "Load control system having a broadcast controller with a diverse wireless communication system", and system controller as described by Kyle Thomas Barco et al. in U.S. Patent Application No. 20170123390, published May 4, 2017, entitled "COMMISSIONING LOAD CONTROL SYSTEMS", which are herein incorporated by reference. These patents provide a detailed example of how load control system 100 may operate. Other examples are possible.

The load control devices of the load control system 100 may include microphones and may be referred to herein as microphone devices. For example, the plug-in device 190, which may be mounted on a wall or a flat surface, or sit on a table, may include a microphone. In addition, the load control system 100 may include a microphone device that may be a separate dedicated microphone device in the load control system, i.e., the load control system may contain one or more microphone devices that do not control electrical loads.

The wall-mounted load control devices (such as the lighting control devices 120 and the keypad 176), which may be installed in electrical wallboxes, may include microphones and may have better reception of acoustic sounds and/or noises since these devices are mounted at a height above the floor and tabletop surface and may have reduced obstructions. In addition, electrical wallboxes are typically installed near entranceways, thus enabling the microphone devices to easily receive acoustic sounds and/or noises from occupants moving through doorways and/or from opening and closing of doors. With the microphones integrated into the wall-mounted load control devices in electrical wallboxes, the load control system 100 may provide a network of microphone devices that are located in several rooms of a house or building and may listen for voice commands and/or ambient sounds. Each wall-mounted load control device may include a microphone (e.g., the lighting control device is a microphone device), or alternatively, the microphone device may be installed in a wallbox adjacent to the load control device, but in a separate housing (e.g., the lighting control device and microphone device are separate devices) Or, the microphone device may be installed in a faceplate of one or more load control devices. Other examples are possible.

When the microphone device is integrated in a load control device, the microphone device may communicate on either a different protocol or a different frequency channel for acoustic data vs. system communication due to higher data throughput requirements of audio signal processing. For example, the microphone device and/or the system controller may use a first protocol for streaming acoustic data (e.g., Wi-Fi or BLE), and a second protocol for communication with the load control system (e.g., ZigBee, Thread, ClearConnect, Z-Wave, etc.), where the first protocol may have a higher data throughput than the second protocol. For example, the load control system may communicate load control commands using the second protocol, and the first protocol may be reserved for communicating acoustic data. The microphone devices may be integrated with the load control system.

The control devices of the load control system 100 may be programmed (e.g., commissioned and/or configured) in response to received voice commands. For example, a user may associate a remote control device with a lighting control device by holding a button on the remote control device and saying "associate remote control". In addition, the user may adjust operational settings (e.g., a high-end trim, a low-end trim, a fade time, a delay time, an occupancy sensor timeout, an occupancy sensor sensitivity, etc.) of the control devices using voice commands.

The use of a microphone device for voice recognition in a load control system may provide many benefits to the user, including but not limited to: control of loads; vocal interactions with a web search engine for weather and traffic information, etc.; intercom or phone calls, conversation and voice recording, etc. The microphone devices may also be operable to replay conversations.

Figure 2A:
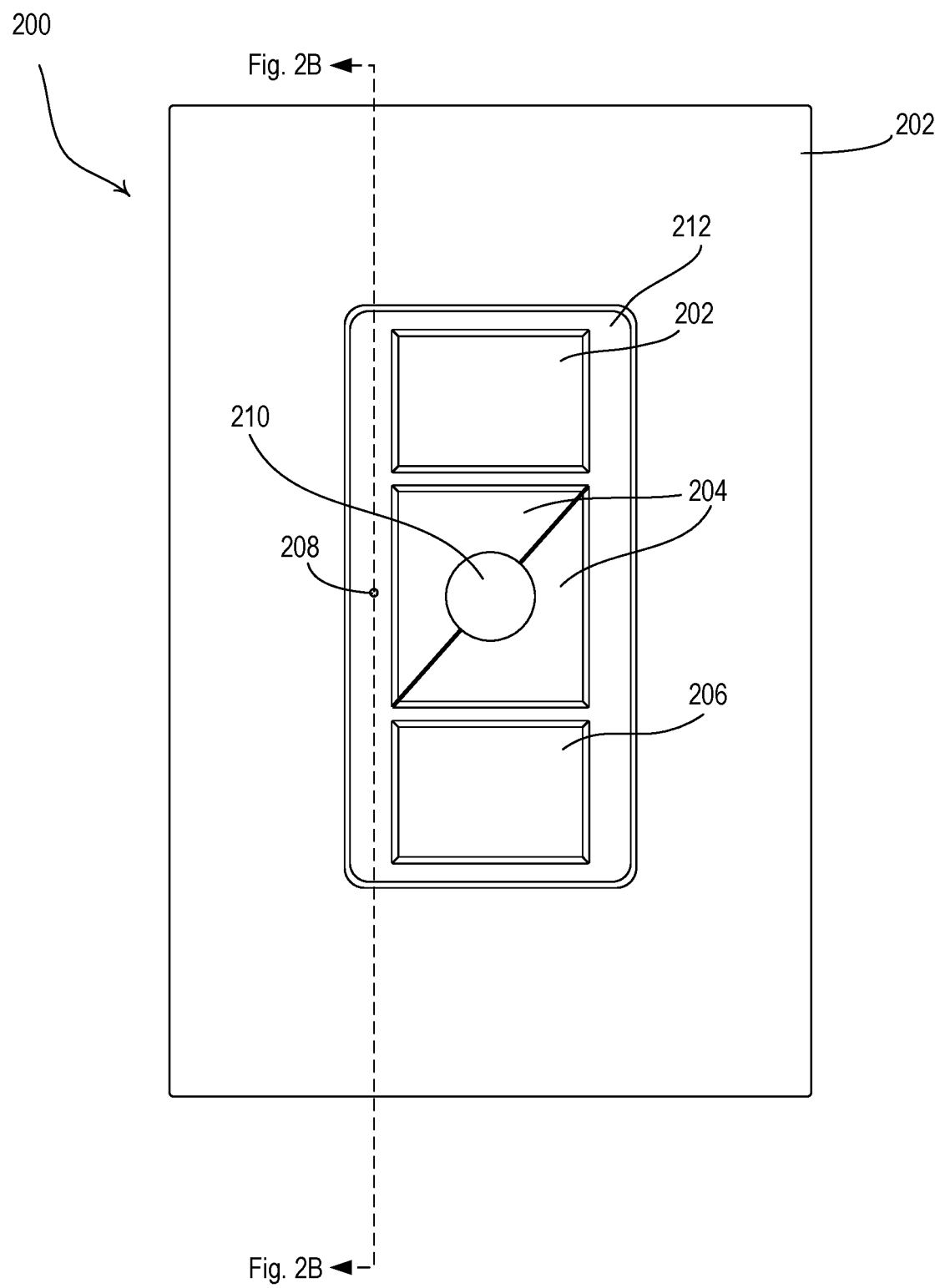
FIG. 2A is a drawing of an example microphone device with acoustic orifice.

FIG. 2A is a front view of an example microphone device 200, which may be a load control device. For example, the microphone device 200 may have integrated lighting control capabilities, that is, the microphone device 200 may control an electrical lighting load. The microphone device 200 may be installed in an electrical wallbox (not shown) and may have a faceplate 202. The faceplate 202 may cover the electrical wallbox.

The microphone device 200 may further include a bezel 212. The bezel 212 may include one or more buttons. For example, the bezel 212 may have buttons 202, 206 which may turn the lighting load on and off, respectively; buttons 204 to raise or lower the light level; and a button 210 for a preset light level. For example, the microphone device 200 may change a light intensity of the electrical lighting load in response to a button press on any of the buttons 202-210 of the microphone device 200. The preset button 210 may be a user-selected preset light level which may be configurable by a user. Examples of presets for lighting control devices are described in more detail in U.S. Pat. No. 6,380,696, by Tarvinder Sembhi et al., issued Apr. 30, 2002, entitled "MULTI-SCENE PRESET LIGHTING CONTROLLER", the entire disclosure of which is hereby incorporated by reference herein.

The microphone device 200 may comprise one or more input microphones (not shown) which are recessed behind the bezel 212. The bezel 212 may have an orifice 208 for allowing the passage of sound through the bezel. Alternatively, the input microphones located within the housing of the microphone device 200 may be covered by a speaker grille, cloth, or the like to protect them from dust, debris, and damage. The input microphones may be recessed from the surface of the housing and channeled acoustically via a tube, opening, or acoustic horn, to the surface of the housing. For example, the input microphones may be configured to utilize gaps in plastics, which may allow sounds to reach the microphone without requiring holes, grilles, and the like on the surface of the microphone device, which may disrupt the aesthetic design of the microphone device.

Figure 2B:
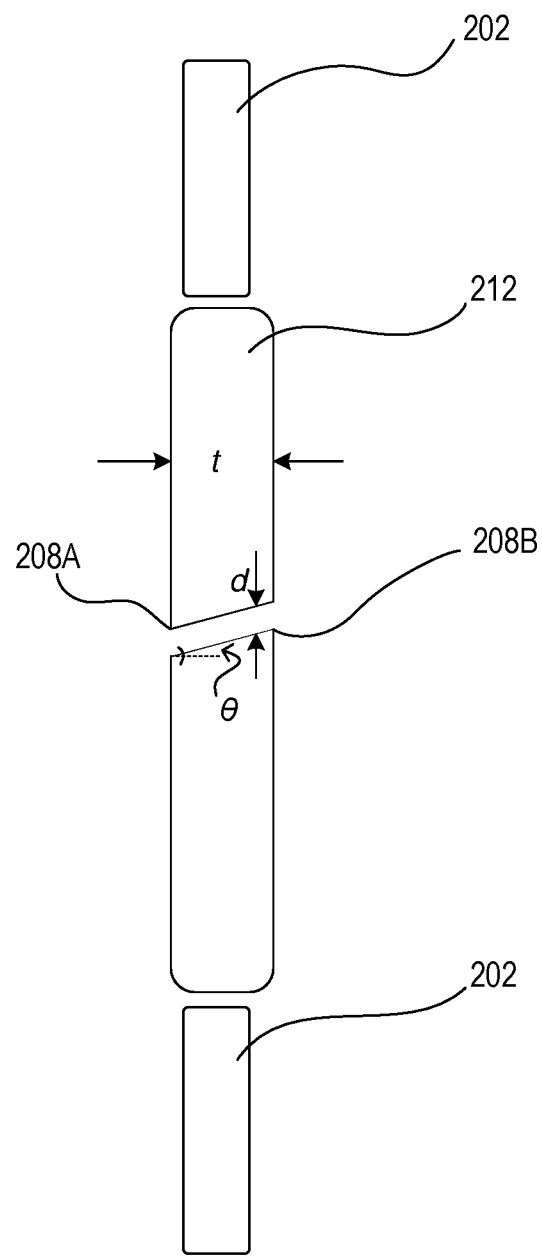
FIG. 2B is a cross-sectional view of the front of microphone device of FIG. 2A.

FIG. 2B is a side cross-sectional view of the microphone device 200 taken through the orifice 208. The orifice 208 may be configured such that front top edge of the orifice 208A may be at the same point vertically, or at a lower point vertically, than the bottom back edge 208B of the orifice. For example, if the bezel 212 has a thickness t, and the orifice has a diameter d, the angle θ may be greater than or equal to the arctangent of the orifice diameter over the material thickness, according to the following formula:

$$\theta \geq \arctan(d/t)$$

The upward slope of the orifice may serve to reduce the amount of dust and/or debris entering the guide tube, as well as improving the aesthetic appeal by making the orifice appear less dark. Although this structure is described for a single orifice, one will understand that this may be used for multiple orifices, including an array of orifices.

Referring back to FIG. 1, the microphone devices may receive acoustic sounds and transmit acoustic data to a cloud server on the Internet 112 for processing the acoustic data. The Internet 112 may be connected to many different cloud servers which process acoustic data. Each cloud server may host a service which processes the acoustic data. For example, the Internet 112 may be connected to one or more cloud servers which host a voice service for interpreting acoustic data that includes voice commands. For example, the voice services may include a first cloud server 116 which hosts Amazon Voice Services; a second cloud server 117 which hosts Google Voice Services; and a third cloud server 118 which hosts an other voice service, etc.

The microphone devices may identify acoustic signatures and transmit them to a remote cloud server for additional processing. Acoustic signatures may be audio data of interest. For example, acoustic signatures may be all acoustic signals sensed by the microphone device, or it may have some restrictions, such as acoustic signals which are voice commands specifically intended for processing (e.g., as identified by a specific keyword or wake word), or acoustic signals which fall within or above one or more thresholds (such as a frequency and/or amplitude threshold), as will be described in greater detail herein.

Microphone devices may detect a specific vocal keyword, that is, a "wake word", whereby the microphone device begins recording and transmitting acoustic data to a voice service after detecting the wake word. For example, a user may say "Alexa" to trigger the microphone device to begin listening. The microphone device may then transmit acoustic data when a subsequent phrase is uttered; for example, "what is the weather?". For example, the microphone device may then transmit the subsequent phrase to the cloud server for acoustic processing. Alternatively, the microphone device may transmit the data to the system controller 110. The system controller may then transmit the data to a voice service on a cloud server for acoustic processing, or the system controller may locally process the acoustic data.

Acoustic processing and identification may be done locally either at the microphone device or at the system controller, based on the determination of whether the signal is an acoustic signature (i.e., audio data of interest for additional processing). If the microphone device or system controller determines that additional processing is necessary, the acoustic data may be sent to a server (i.e., a cloud server on the Internet) for processing. The microphone device may transmit acoustic data to the system controller to send to the cloud server through the router 114, or the microphone device may transmit acoustic data directly to the router 114 via Wi-Fi (i.e., without the need for a centralized system controller). Alternatively, the microphone device may transmit acoustic data to the system controller, and the system controller may interpret and determine whether the data should remain local or be transferred to the cloud server for cloud processing. Although a cloud server has been described, one will understand that any server may be used, for example, a dedicated server. For example, the system controller may handle some or all of the acoustic processing in place of, or in addition to, the cloud server.

One of the load control devices of the load control system 100 (e.g., one of the lighting control devices 120) may be configured to receive a voice command and transmit acoustic data to the cloud server for processing. The load control device may then receive a response from the cloud server, interpret the response to determine a command for controlling a connected electrical load, and control the connected electrical load in response to the received voice command.

The microphone devices may monitor received audio inputs from users, for example, and corresponding received responses from the cloud server, and over time to learn responses to commonly used acoustic signatures for that space. For example, a command to "turn on the lights" as the most frequent command received by the microphone device in the kitchen may allow the system (i.e., the microphone device and/or the system controller) to associate the acoustic signature "turn on the lights" with the load control command to turn the lights on. In this way, the load control system may respond to these learned commands through a local determination, without the need for cloud processing.

The machine learning and pattern recognition of audio inputs may be processed locally to the device, the system controller, or may be processed within the cloud server and transmitted to the device. For example, the cloud server may determine the most frequently used command phrase and may "teach" the microphone device and/or the system controller the characteristic audio signature to respond to. This local response optimization of frequently used commands for an area may help reduce lag in response time, as well as reduce system dependence on Wi-Fi and Internet communication if external communication is down.

Cloud processing may use a cloud-based voice recognition software service, i.e., a voice service, such as Amazon Voice Services, Ski, Cortana, Google, or the like, located on a remote cloud server. The microphone device may be voice service agnostic, that is, the voice service used for signal processing and voice recognition may be selectable and not pre-configured.

The voice service may be configured by the user. In a first example, the voice service may be configured at the time of setup of the system. For example, a user may select a voice service to use with the microphone device as part of a configuration of the microphone device or load control system. In a second example, the microphone device may dynamically select which voice service to use from two or more voice services each time a vocal request is made. The dynamic selection of the voice service may be based on the type or content of the request, which may be setup during a configuration of the microphone device, as described herein.

Figure 3A:
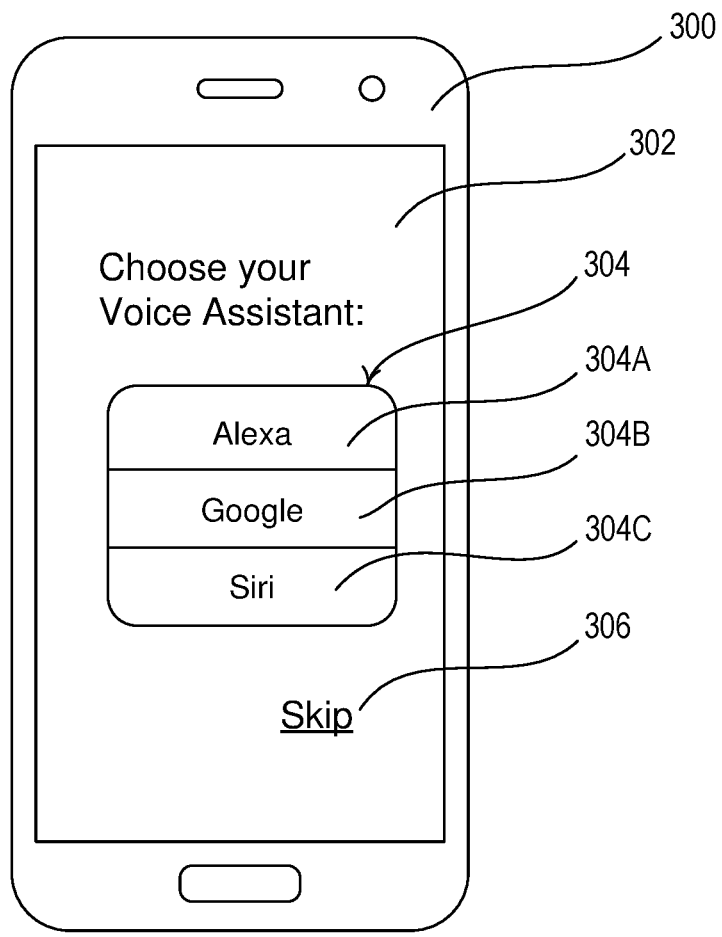
FIG. 3A is an example mobile application screen on a mobile device for allowing a user to select a voice service.

The voice service may be selected at setup from a list of voice services in a mobile application. A user may setup voice service for the load control system through a mobile application on a cellular phone or tablet, for example. The mobile application may wirelessly communicate with the microphone devices. For example, the mobile application may communicate with the wireless devices via Bluetooth or Wi-Fi. Or, the mobile application may communicate with a system controller 110 via Bluetooth or Wi-Fi. The system controller may then communicate with the microphone devices which voice service to use. Or, the microphone devices may transmit acoustic data to the system controller and the system controller may then transmit the acoustic data to the voice service, as previously described. FIG. 3A shows an example mobile application on a mobile device 300, where the screen 302 allows a user to select from a list of voice services 304, for example, Amazon Voice Services' Alexa 304A, Google Voice by Google 304B, or Apple's Ski 304C. This list may be expanded to include other voice services such as Microsoft Cortana, etc. Additionally, the user may have the option to skip (306) the selection, and a default voice service may be selected.

Alternatively, the voice service used may be dynamic, that is, dependent on the type or content of the user request. For example, the query "what are the current traffic conditions" may be sent to the Google server for signal processing, whereas "tell me a joke" may be sent to Amazon Voice Services. According to this embodiment, after an initiation keyword (i.e., a wake word) has been spoken, the identification of a word of interest within the phrase may determine which cloud service to use.

As described, the recognition of a verbal command may require a wake word, or initiation keyword, such as "Alexa" or "Google". The wake word may determine which voice service is used, that is, the voice service may be dynamically selected from multiple voice services based on the wake word used. For example, Amazon Voice Services may require a user to use the keyword "Alexa". As described, the wake word may be used to select the voice service used for the remote signal processing. For example, if a user says the initiation keyword "Alexa", the voice data may be sent to Amazon Voice Services, whereas if the wake word "Siri" is used, the voice data may be sent to an Apple server for voice processing.

In addition to traditional wake words associated with specific voice services, a user may setup a generic wake word during configuration of the microphone device. A generic wake word may be any word selected by the user and configured in the setup as a wake word. For example, the word "home" or "computer" may be used as a generic wake word. A user may use a mobile application to setup the generic wake word. For example, the mobile application may communicate wirelessly to the microphone device, either directly or via the system controller and/or router. The mobile application may prompt the user to enter or speak an initiation keyword, which may then be used as a generic wake word.

Figure 3B:
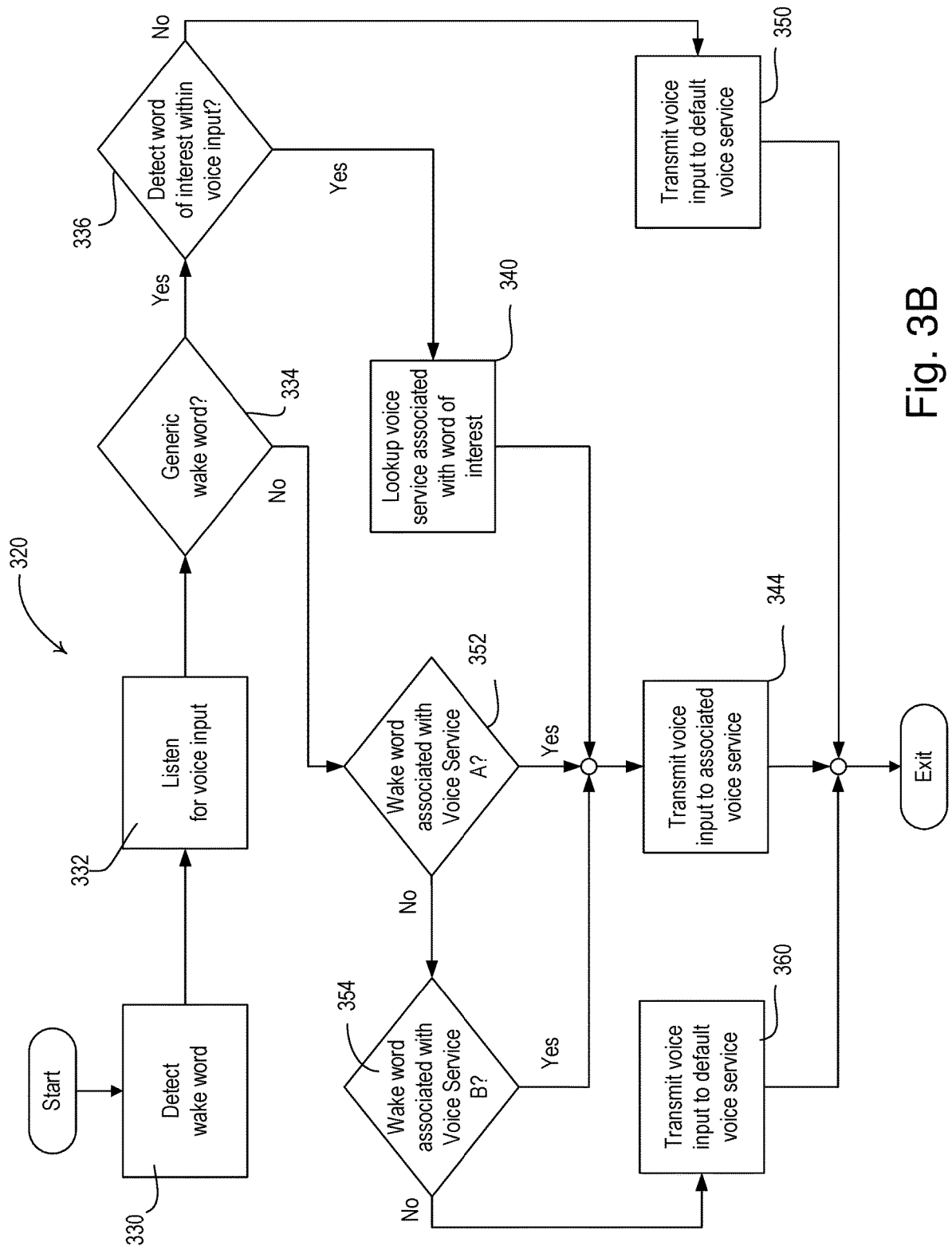
FIG. 3B is an example method which a microphone device may use to dynamically select a voice service.

FIG. 3B is an example method 320 a microphone device may use to dynamically select a voice service. The microphone device may detect a wake word at step 330. After detecting the wake word, the microphone device may listen to receive voice input from the user following the wake word at step 332. At 334, the microphone device may determine whether the wake word is a generic wake word. A generic wake word may be a word selected by a user at the time of setup which is not necessarily associated with a particular voice service. For example, the wake word may be a word such as "home" or "computer".

If the wake word used is a generic wake word, at 336, the microphone device may determine whether a word of interest has been detected within the voice input. A word of interest may be a keyword that triggers a specific voice service. The word of interest may be processed locally by the microphone device or the system controller. If a word of interest has been detected, the microphone device may determine which voice service is associated with the word of interest at step 340. For example, the microphone device may have a lookup table containing a list of words of interest wherein each word of interest is associated with a particular voice service. One or more words of interest may also be selected by a user at the time of setup. For example, a user may input one or more words of interest by typing or selecting them from a list in a mobile application and selecting a voice service to be used for each word. Or, the list may be a default list that is already configured at the time of setup and a user may optionally change which voice service to use for each word of interest. Some example words of interest may be "traffic" or "joke", for example.

At step 344, the microphone device may transmit the voice input to the associated voice service for additional processing and response to the user input. For example, the word "traffic" may trigger the use of the Google server, whereas "joke" may trigger Amazon Voice Services. The method may then end.

If no word of interest has been detected within the voice input at step 336, the microphone device may transmit the voice input to a default voice service. The default voice service may be setup by a user or may be a voice service used when the user has not selected a voice service.

If a generic wake word has not been detected, the microphone device may determine at step 352 if the spoken wake word is associated with voice service A. For example, if Voice Service A is Google Voice services, and the wake word was "Hey Google", the microphone device may determine that the wake word was associated with voice service A. The microphone device may than transmit the voice input to the associated voice service (i.e., Google Voice services) at step 344. However, if the wake word was "Alexa", at step 352 the microphone device may determine that the wake word is not associated with Voice Service A (i.e., Google Voice services). At step 354, the microphone device may then determine whether the wake word is associated with a second voice service, voice service B, such as Amazon Voice services, for example. If the wake word is associated with voice service B (e.g., the wake word was "Alexa" and voice service B is Amazon Voice services), the microphone device may transmit the voice input to the associated voice service at step 344. However, if the wake word was not associated with Voice Service B, the microphone device may then transmit the voice input to a default voice service (such as Microsoft Cortana, for example). The method may then end.

One will understand that the voice services described herein are for example purposes only, and that any voice service may be used. Additionally, the microphone devices may not be limited to three different voice services but may use any number of different voice services. Also, although the method is shown in a particular order, it is contemplated that the steps of the method may be used in any order.

Flexibility in choosing and/or using a voice assistant, either through manual selection by a user, or dynamically during operation of the load control system, may provide several advantages. First, the user may have more flexibility in choosing future home integration devices, without the need to choose a specific service up front (i.e., when purchasing the device) which may not be compatible with future devices. Second, in cases where the default cloud server is down or experiencing significant latency, the system (i.e., the microphone device or a system controller) may choose a different voice service for processing after an expected response time period has elapsed, to ensure service continuity for the user.

Figure 3C:
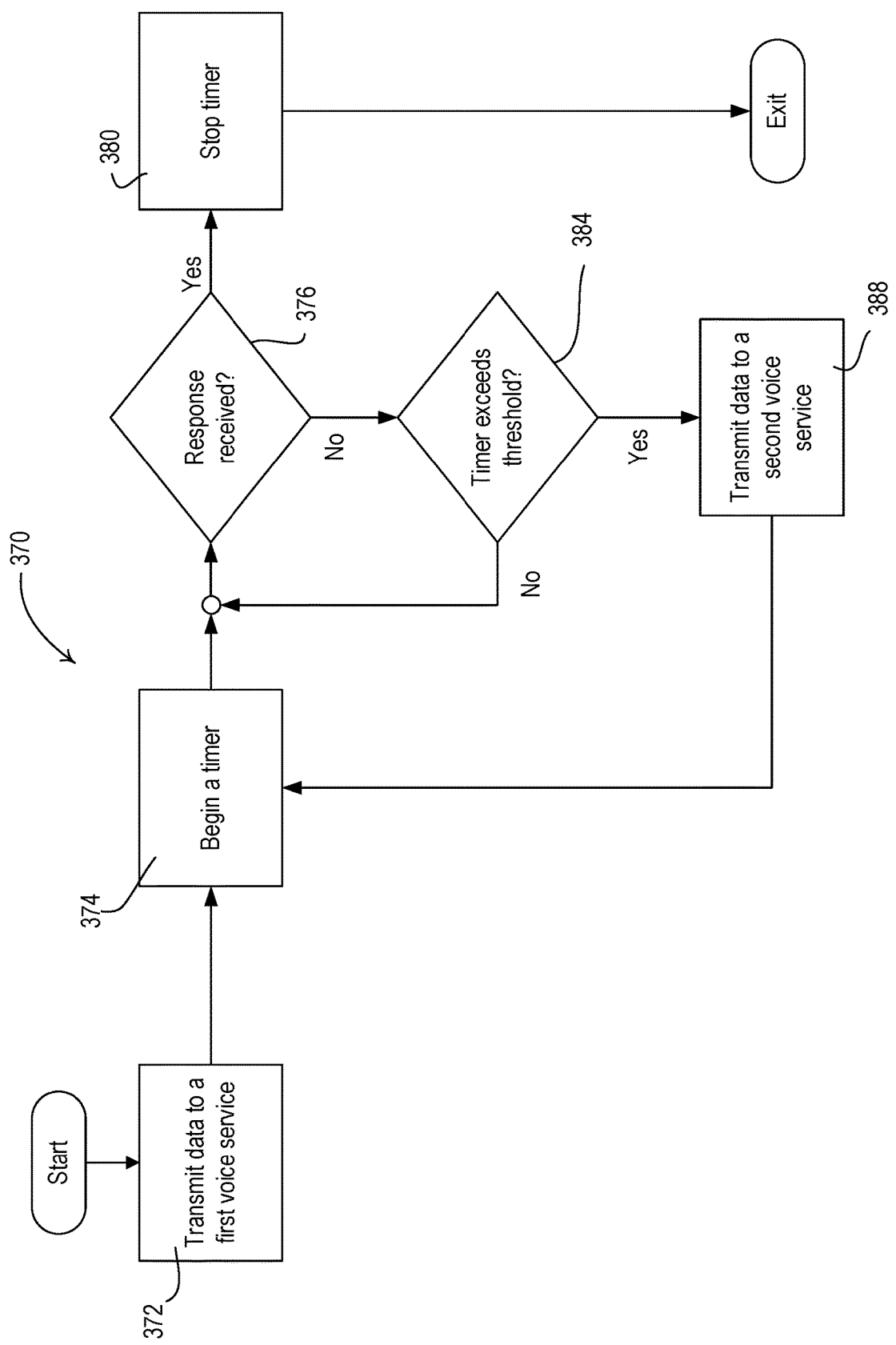
FIG. 3C is an example method by which a microphone device may choose a different voice service when the first selected voice service is experiencing significant latency.

For example, FIG. 3C is an example method 370 by which a microphone device may choose a different voice service when a first selected voice service is experiencing significant latency. The method 370 may start when the microphone device transmits data to a first voice service at 372. At step 374, the microphone device may start a timer or counter upon transmitting acoustic data to a voice service on a cloud server for processing. The microphone device may then determine whether a response has been received at step 376. If the microphone device receives a response from the voice service before the counter exceeds a threshold, the microphone device may stop the timer at step 380 (e.g., reset the counter to zero and stop the counter). The method may then end.

However, if the microphone device does not receive a response from the voice service and the counter exceeds the threshold at step 384, the microphone device may transmit the acoustic data to a different voice service on a different cloud server for processing at step 388. The device may either reset the counter or start a second counter/timer at step 374 and repeat the process.

Alternatively, the microphone device may transmit the audio data to two or more voice services at the same time and wait to receive a response from the faster voice service. Although the methods herein have been described with respect to a microphone device, one will understand that the system controller may alternatively send the audio data to one or more voice services for processing. For example, the microphone devices may communicate with the system controller to determine which voice service to use. For example, the microphone device may transmit the wake word, or the wake word and the command, to the system controller, and the system controller may interpret which voice service to use according to any of the previous examples. The system controller may then tell the audio device which voice service to use, or the system controller may transmit the audio data directly to the voice service and subsequently provide the response to the respective audio device.

For example, the microphone device may transmit the wake word to the system controller. The system controller may interpret the wake word and determine which voice service from a group of voice services is associated with the wake word. The system controller may then receive the acoustic data from the microphone device and transmit the acoustic data to the voice service associated with the wake word (i.e., the selected voice service).

In a second example, the system controller may select a voice service based on the wake word from the microphone device as previously described. The system controller may then transmit which voice service is the selected voice service back the microphone device. The microphone device may then transmit the acoustic data to the selected voice service.

The microphone devices may also be responsive to other sounds besides vocal commands and conversations. For example, the microphone devices may identify other user-generated sounds such as screams or yells; personal sounds such whistles, claps, snaps; snoring; coughing/sneezing; laughing; etc. Any or all of these user-generated sounds may be used to recall a scene. For example, a scene may be triggered based on a clap, which may turn on all the lights in a space.

The microphone devices may further identify other environmental sounds, such as sounds from: appliances, media, water, cooking, movement, device failure, emergency sounds, health/mood, airflow, exterior/outdoor sounds, and pet sounds, among others. The microphone devices may passively sense these other environmental sounds, which may act as inputs to which the user may specify a desired output action by the load control system. In one example, a user may configure the load control system to integrate with appliances and other home devices which are not "smart"-enabled by learning input sounds and desired actions based upon the input sounds. In this way, state changes are sensed acoustically rather requiring the appliances to have additional processors and wireless communication capabilities. For example, upon receiving a particular acoustic signature, the microphone device 120 may determine that the dryer 176 has completed its cycle. The microphone device 120 may then initiate other actions in the system, such as flashing the light 122 in room 102 that the user (i.e., occupant 180) is occupying, or sending a push notification to the mobile device 182 to let occupant 180 know that the dryer has finished its cycle.

The load control system may also enable scenes in response to certain acoustic signatures. For example, the microphone devices may recognize a characteristic sound, such as the Deep Note audio trademark of THX playing on the television 144. The load control system may then automatically select a movie scene in which the load control system may lower the shades 150 and dim lights 132, 122 in room 106. In another example, a microphone device may listen for a combination of sounds to determine an action. For example, a microphone device may identify an acoustic signature of an alarm clock, and the load control system may slowly fade the lights on, or delay or extend the fade upon a "snooze". For example, if a microphone device identifies an acoustic signature of an alarm clock, and the sound abruptly stops, the microphone device may listen for additional sounds of a person getting out of bed. If the microphone device does not hear additional noises after the alarm has abruptly stopped, the load control system may determine that the user has pressed the snooze button. In a third example, the load control system may turn on a bathroom exhaust fan in response to the microphone device identifying a water noise (i.e., from a shower) for an extended period of time (e.g., more than two minutes). The microphone device may also detect leaks through the sound of water dripping, and may alert a user of the sound and location.

A user may setup the load control system to provide various output responses based on a recognized acoustic input. That is, the load control system may learn to associate a particular action or load control command with a particular sound. The load control system may generate alerts (such as for a water leak), send push notifications to a user, etc. The microphone devices may also integrate with other devices in the system, for example, occupancy sensors.

Additional output responses may be enabled in a load control system with machine learning capabilities, which allows the system to adapt to a changing home environment through pattern mapping and correlating the measured acoustic data to a database of known sounds, times of day, specific users and locations, specific activities, other system states. The discovery may be further enhanced through active reporting and feedback from the user, and may additionally include prompted queries to the user for confirmation and/or identification of an event to provide additional information which then assists the system in the pattern mapping and correlation. The user queries may be any or a combination of voice communication, a mobile notification, audio-visual communication, and the like.

A database may store and catalog sounds in a sound library. The sound library may be built over time through collecting and "crowd-sourcing" sounds from various user inputs. Alternatively or additionally, the sound library may be built through a learning or commissioning period where the user actively teaches the database different sounds, or the database may passively learn the sounds by correlating them with specific actions through machine learning. The sound library may be stored on a server, for example a cloud server 118 on the Internet 112, in the device's own memory, in the system controller, or any combination of these. Using machine learning algorithms on the cloud server during a learning period may allow the system to operate independently from the cloud after the learning period has finished, i.e., not requiring access to the Internet 112.

This may also be used, for example, during setup of the system to configure any word to be used as a generic wake word. For example, a user may repeatedly say the generic wake word during a training mode which may be initiated during configuration of the microphone device or the load control system. For example, training may be done through a mobile application. The mobile application may communicate wirelessly to the system controller or a cloud-based server. The microphone devices and/or the system controller may also be trained to recognize specific sounds. For example, a user may repeatedly open and/or close a door to train the microphone device to recognize a sound.

A user (e.g., occupant 180) may use the mobile application to associate the sound with a specific response from the load control system. For example, a user may manually train the load control system to turn on a light in response to a specific sound. A user may manually train the load control system to recognize the specific sound by repeatedly creating the sound and teaching the load control system the sound (e.g., through a mobile application). The user may then input the desired specific response from the load control system when the sound is identified, or the user may choose from a suggested list of actions. For example, when the microphone device hears the door open, a load control device may turn on the lights. This association between a sound and a corresponding action of the load control system may also be used in conjunction with conditional logic, similar to, for example, If This Then That (IFTTT) logic. For example, if a microphone device hears a bedroom door open during the night, the load control system may turn on the bathroom lights to a dimly lit level.

The load control system may also use machine learning to learn any of the sounds. For example, the load control system may automatically learn sounds and begin to correlate the sounds with actions. For example, the load control system may be configured to log sounds and corresponding actions, which may be processed by a server on the Internet 112. For example, the server may be a server such as the "other server" 118 shown in FIG. 1, which may be capable of processing generic acoustic sounds and may further be capable of machine learning and storing load control actions. For example, the microphone devices may transmit audio data to the system controller 110. The system controller may transmit the audio data to a server. Following (or before) transmission of the audio data, a load control device may control an electrical load. The system controller may also transmit the load control action to the server. For example, the microphone device may record the sound of a bedroom door opening. The load control device may then turn on lights in the bathroom to a dim level. The sound of the bedroom door opening and the action of turning on the bathroom lights to a specific intensity level may be sent to the server 118. For example, the microphone device and the load control device may transmit the acoustic signature and the load control action to the server directly, or the microphone device and the load control device may transmit the acoustic signature and the load control action to the system controller. The system controller may then transmit the acoustic signature and the load control action to the system controller. As the server begins to log information over time, the server may be configured to use machine learning to notice patterns and associate them. For example, when the bedroom door noise is heard, the bathroom light should turn on to a dim level, but only during the night.

The load control system may also use machine learning to determine actions associated with specific users. For example, during or after the learning period, the system may determine that the household consists of three separate persons. A microphone device and/or the system may then ask a user for confirmation to identify that there are three separate persons, and upon hearing a sound or voice command, the system may guess a specific user and/or prompt one of the occupants to name an identity with which to associate the user. The microphone device and/or system controller may query a user via audio communication, a push notification on a cell phone, wearable, tablet, or other mobile device, a television display, or the like. Over time, as the load control system learns sounds in the environment and can identify different users of the space, the load control system and/or microphone devices may also begin to predict a user's movement path, and personalize the space for the user, which may include storing personalized favorites, predicting a user's desired effect, or making suggestions to the user.

The use of a sound library and machine learning algorithms may allow the microphone devices to become aware if a sound in the space is unknown. The detection and identification of sounds may be based on a confidence threshold for correct identification. When a confidence threshold has been reached for an unidentified sound (i.e., the system has determined that the sound is not background noise), the microphone devices may alert the occupant that an abnormal sound was detected. Additionally, sounds which correlate to a warning sound from a library of known warning sounds (such as a scream, breaking glass, crashing or falling, etc.), may be used to detect emergencies in public areas and provide an action based on the emergency type. For example, if the load control system determines that one or more microphone devices have detected breaking glass, the load control system may send a command to the security system or notify security personnel.

The load control system may also be capable of detecting health and mood sounds, and/or autonomously making adjustments in the space for occupant comfort and productivity. For example, if the load control system determines that productivity has declined (e.g., rate of typing on a keyboard has slowed), and that ambient background noise is high, the load control system may provide focused noise cancellation in the direction of the user that is typing. For example, one or more speakers in the load control system may output sound to cancel the noise in the room. Other sensor inputs may also be used in determining user location, such as image sensing, local pressure sensor in a user's chair, RF beacon technology, etc. Alternatively, if the load control system determines productivity has declined and ambient background noise is low or normal, the load control devices may increase the brightness or the color temperature of the lighting in the space to make the user more alert.

The load control system may also provide feedback, for example, aggregate data measuring a viewer's responsiveness to movie previews or ads. Particularly in commercial office or manufacturing environment, the load control system may also be able to track productivity levels, and OSHA noise hazards, and report them to the facility manager or supervisor. Different sound levels may indicate different levels of productivity depending on the room or area. For example, loud machinery running may indicate the productivity level is adequate; however, if the environment is quiet, the absence of machinery noise may indicate that the machine is experiencing down time or a production line may have a problem. In a second example, loud background noise in an office space may indicate that distractions are present, such as people talking, etc., which may indicate a lower productivity level. The load control system may be configured (i.e., programmed) with a certain volume level of expected sound, which may correlate to productivity levels as described. For example, the load control system may trigger an alert if the sound in the room is outside (i.e., greater or less than) an expected volume level or volume range for a period of time (the period of time may be defined at configuration of the load control system, for example, 10 minutes).

The load control system may also include speakers. The speakers may be integrated into one or more microphone devices, and/or the speakers may be separate from the microphone devices. The speakers may provide focused noise cancellation direction to a specific area in a room, for example, using beamforming. Alternatively, the speakers may boost the amount of white noise in a space. Other sounds the system could respond to may include: water sounds (leaking, dripping, usage measurement), cooking, movement (walking, doors opening, windows opening, blinds drawn), device failure sounds (mechanical noises, whirring, clicking, etc., indicating an appliance is starting to reach end of life), airflow, pet sounds, etc.

Responses of the system based on received acoustic input may be learned over time based on how a user responds to the sounds and integrating the user response into the system response. For example, the system may learn that when the doorbell rings after sunset, a user will turn on the outside light when answering the door. The system may then learn to anticipate a user's response and perform the intended action for the user. System responses may include the control of loads, predicting a user's movement and/or path, determine the mood or activity of a user, assess emergency status of a situation, generate alerts, track activity, and generate reports.

When expected sounds do not occur, the load control system may alert a user that an expected sound (i.e., an expected activity) has not occurred. For example, when the system learns that a child arrives at home at a certain time, the system may determine this event has not occurred if the microphone devices do not hear the door close. When the system determines that the door has not closed, the system may alert the user that the door has not closed, and/or if the action of the door closing has been associated to the child arriving home, the system may alert the user that the child has not arrived home. A user may teach the load control system which sounds to associate to which actions or events, as previously described.

Figure 4:
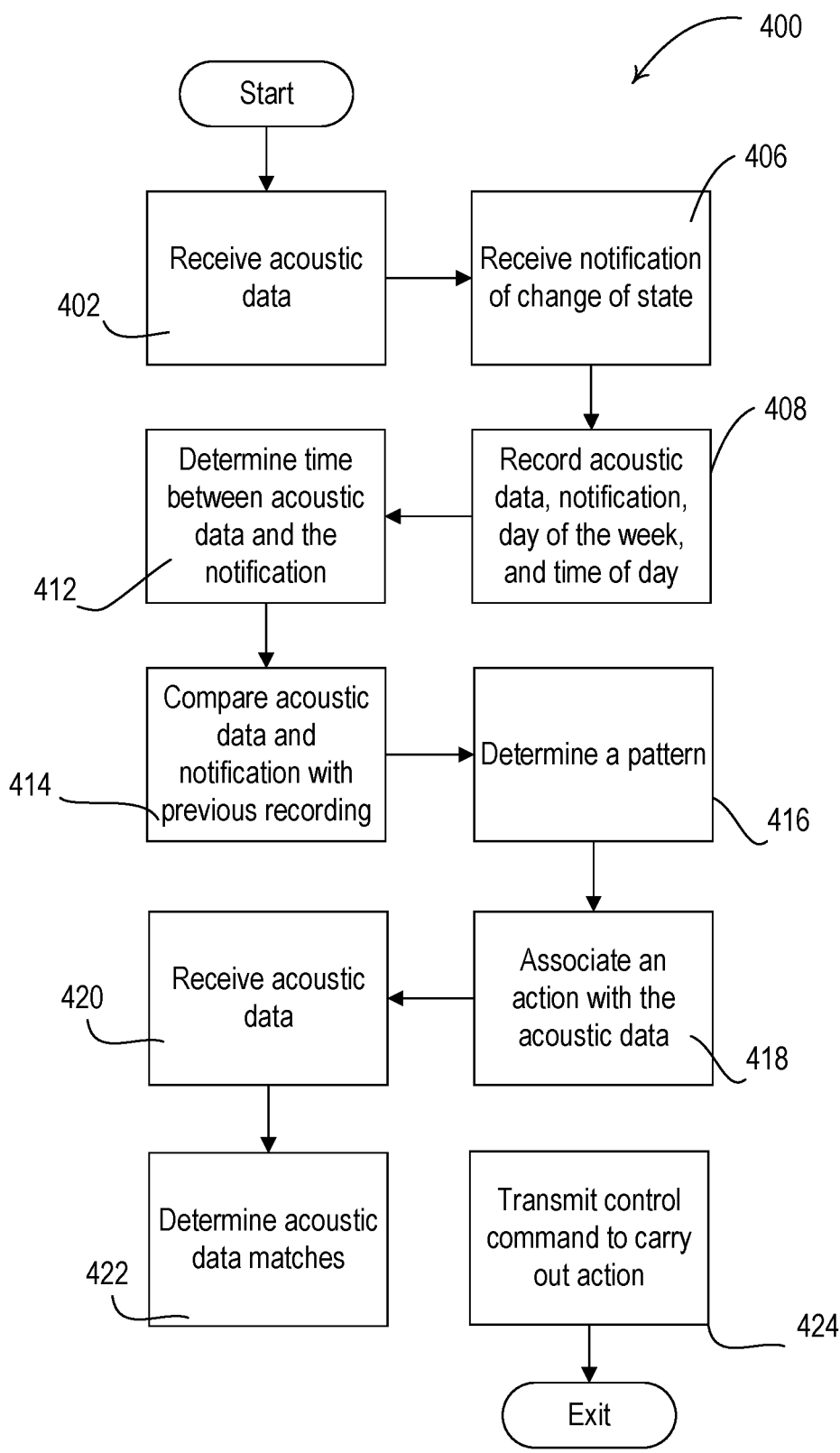
FIG. 4 is an example method which may be executed by a server, for example, to associate a received sound with an action.

FIG. 4 is an example method 400 which may be executed by a server to associate load control actions with acoustic sounds. The method may start when the server receives acoustic data at step 402. The acoustic data may be audio data of interest received from a microphone device. For example, the acoustic data may correspond to a user opening a door and walking into a room.

After receiving the acoustic data, the server may receive a notification that a change of state (i.e., a load control action that may be defined by a command) has occurred in the space at step 406. For example, a user may press a button on a load control device, such as a light switch or dimmer. In response to pressing the button, the load control device may control (e.g., turn on) an electrical load, such as a light, for example. The load control device may transmit a notification to the server indicating the change of state, that is, that the load control device has turned on the load. One will understand that external sensors may be used in place of a load control device transmitting a notification. For example, a light sensor may detect that a light has been turned on in a space, and the light sensor may transmit a notification of a change of state to the server. In addition, the server may transmit a command to the load control device, e.g., in response to receiving an input from a remote control device and/or a network device, such that the load control devices does not need to transmit the notification to the server.

At step 408, the server may store the acoustic data, the notification (e.g., a command defining how the load control device controlled the electrical load), a current day of the week, and/or a current time of day. In addition, the server may store a time of the day and/or a day of the week at which the acoustic sound occurred at 408. For example, the server may store the above to memory. At step 412, the server may determine the amount of time between receiving the acoustic data and receiving the notification. For example, the server may receive the acoustic data of the door opening two seconds before receiving the notification that the light has turned on. In addition, the server may determine if the load control device controlled the electrical load within a period of time after the time at which the acoustic sound occurred at step 412.

At step 414, the server may compare the recorded acoustic data and the notification with any previous recordings that may be stored on the server. For example, the server may store the door closing sound every time it hears the sound. The server may then compare the currently received acoustic data with each of the previous recordings to determine which recordings match the currently received acoustic data. The server may then compare the notifications of state change (e.g., the commands) and confirm that the state change is the same for each.

Alternatively, the server may compare the currently received acoustic data with a library or database of known acoustic sounds, as previously described. The server may correlate the currently received acoustic data with one or a group of acoustic sounds to identify the sound. For example, the server may identify the currently received acoustic data with a door opening (or closing). This may allow the server to store the received acoustic data as a door opening (or closing), instead of storing all of the acoustic data, in order to save space.

At step 416, the server may determine a pattern between the acoustic sound and the notification. For example, the server may use machine learning to determine that the acoustic sound and the notification appear in similar instances at a specific time of day, and/or a specific day or days during a week. In addition, the server may determine if two acoustic sounds are similar and two related commands are the same at step 416. The server may use the historically recorded information to determine the pattern. After determining a pattern, the server may then associate an action with the acoustic data at step 418. For example, the server may associate the action of opening the door with the notification of a change of state of the lights from off to on, i.e., the action of turning on the lights. In addition, at step 418, the server may store a validated command as associated with a validated acoustic sound, where the validated acoustic sound represents two acoustic sounds that have been determined to be the similar and the validated command represents two commands that are related to the acoustic sounds and have been determined to be the same. For example, the one of the acoustic sounds may be stored as the validated acoustic sound and one of the commands may be stored as the validated command. The server may also store a validated time range and/or a validate day of the week at 418.

The server may associate the action with the acoustic data according to a condition. For example, the action may be associated with the acoustic data only during a certain time of day, or certain day of the week, according to the associated pattern. At step 420, the server may receive subsequent acoustic data. For example, the server may receive acoustic data corresponding to a door opening. Upon receiving the acoustic data, the server may determine whether the acoustic data matches the pattern of the acoustic data associated with the action in step 422. That is, the server may determine that a subsequent acoustic sound is similar to the validated acoustic sound before transmitting the validated command to the load control device. The server may then transmit a control command (i.e., the validated command) to carry out the action at step 424 in response to receiving the acoustic data. The method 400 may then exit.

Although this method has been described with the example of a server, one will understand that a system controller may alternatively use the same, or an adaptation of, the described method.

Designing each microphone device to continually stream acoustic data to the cloud for processing may cause wireless congestion issues. In addition to requiring a keyword to initiate voice processing, there are several additional congestion mitigation options to reduce the bandwidth of acoustic data streamed from the microphone devices to the Internet. The load control system may impose amplitude or frequency limits on the acoustic data, which may be set by a user, initiated by a system controller, or set and stored in the microphone device itself. These limits may apply a threshold to the data, such that noises which are either very quiet, and/or outside the frequency region of interest (i.e., very low frequency vibration/sounds, or high frequency sounds) are filtered out by the microphone device and not transmitted to the cloud for processing, thereby restricting the amount of data.

Multiple microphone devices may receive, or hear, a single voice command. The microphone devices may be configured to communicate with each other to determine which microphone device(s) should respond to the voice command and/or which microphone devices should communicate with the voice service in the cloud. For example, the microphone devices may be configured to determine which microphone device heard a voice command the best.

Microphone devices in close proximity to one another and receiving the same acoustic signatures may also communicate with each other to determine which device has received the highest quality acoustic signature, and enabling only one device to transmit the acoustic data for further processing. For example, several microphone devices in the same room may decide based on the volume of the sound received (i.e., the amplitude of the acoustic signature) which microphone device should transmit the acoustic data to the Internet for further processing.

For example, the microphone devices may determine which microphone device heard a voice command the best (or with the highest quality) through one or more of the following criteria: volume, proximity to the sound source, least multipath interference (i.e., least amount of phase noise and/or acoustic echoes), highest signal-to-interference ratio (i.e., signal-to-noise or SNR ratio), and/or occupancy condition of the area. For example, proximity to the sound source may be determined based on phase delay of the received sound. For example, upon receiving a voice command, each microphone device may transmit the average volume of the command heard. Each microphone device may receive the average volume of the command heard from the other microphone devices. Each microphone device may then compare its own average volume reading with the received average volumes from the other microphone devices, and determine based on the comparison whether its own average volume was the loudest. The microphone device which determines that its average volume was the loudest may then transmit the acoustic data to the system controller and/or a cloud server for voice processing.

Alternatively to the microphone devices analyzing the data and determining which microphone device heard the voice command the best, the system controller 110 may be configured to analyze audio data from the microphone devices to determine which microphone device heard the voice command the best. Further, the microphone devices and/or the system controller 110 may collaborate (e.g., share audio data) to determine the content of the voice command.

The system may also use data from occupancy sensors to determine which microphone devices to enable for transmission of acoustic data. For example, a user may configure a space such that the transmission of acoustic data by the microphone device in room 102 is only enabled when the occupancy sensor in that space senses that the room is occupied. This may require the user to setup rooms in the system (via a mobile application, for example), to configure the system controller and/or microphone device to respond to occupancy signals from the occupancy sensor in room 102.

In a first example, the occupancy sensor 172 of room 102 may transmit an occupied command to the load control device 120. For example, the occupancy sensor and the load control device 120 may be associated, and the load control device 120 may receive commands from the occupancy sensor. The load control device 120 may be a microphone device. When the user 180 speaks an audio command, the audio command may be heard by one or more microphone devices in rooms 102, 104, 106. The microphone device may determine based on the last occupied command whether the room (i.e., room 102, 104, or 106, respectively) is currently occupied. If the microphone device determines that the room is not occupied, the microphone device may not transmit audio data based on the audio command. However, if the microphone device determines that the room is occupied, the microphone device may transmit the audio data based on the audio command. In this way, the number of microphone devices transmitting audio data may be reduced.

In a second example, the occupancy sensor 172 may transmit the occupied command to the system controller 110. The system controller may then also control the flow of audio data. For example, the microphone devices may transmit the audio data to the system controller, which may transmit the data to a server on the Internet 112 if the room in which the microphone device is located is currently occupied. Or, the system controller may instruct one or more microphone devices located in rooms which are not occupied to not transmit audio data.

Alternatively, the microphone device may contain an occupancy sensor, and may use its own occupancy signals to determine whether or not to transmit audio data. For example, if the microphone device determines the room is occupied, it may transmit audio data. However, if the microphone device determines the room is not occupied, it may not transmit audio data.

Figure 5A:
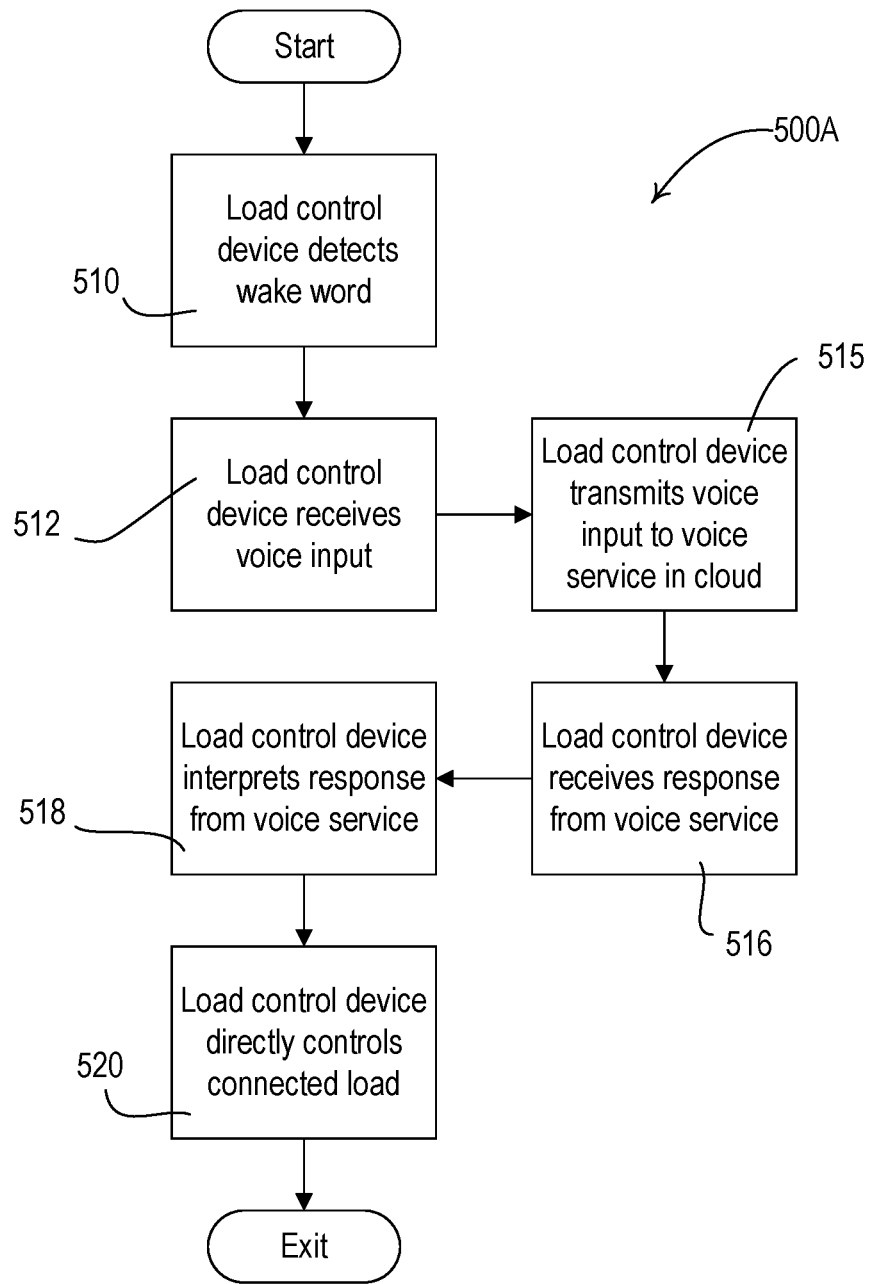
FIGS. 5A, 5B, 6-9, 10A, and 10B are flowcharts of example audio control procedures that may be executed by a microphone device, for example, of the load control system of FIG. 1.

FIG. 5A is a simplified flowchart of an example audio control procedure 500A that may be executed by a load control device of a load control system (e.g., one of the lighting control devices 120 of the load control system 100). The load control device may be configured to control an electrical load. The load control device may comprise a microphone for receiving audio data (e.g., voice commands and/or sounds) and may be configured to directly communicate with a voice service in the cloud to allow for controlling an electrical load connected to the load control device. At step 510, the load control device may detect a wake word. After detecting the wake word at step 510, the load control device may receive voice input comprising a voice command at step 512. The load control device may transmit the voice input to a voice service (e.g., Alexa Voice Services) in the cloud at step 515 (e.g., directly to the Internet via the router 109 and/or via the system controller 110). The load control device may receive a response from the voice service at step 516 and may interpret the response to determine a command for controlling the electrical load at step 518. At step 520, the load control device may then directly control the connected electrical load in response to the interpreted command received from the voice service, before the audio control procedure 500 exits.

Figure 5B:
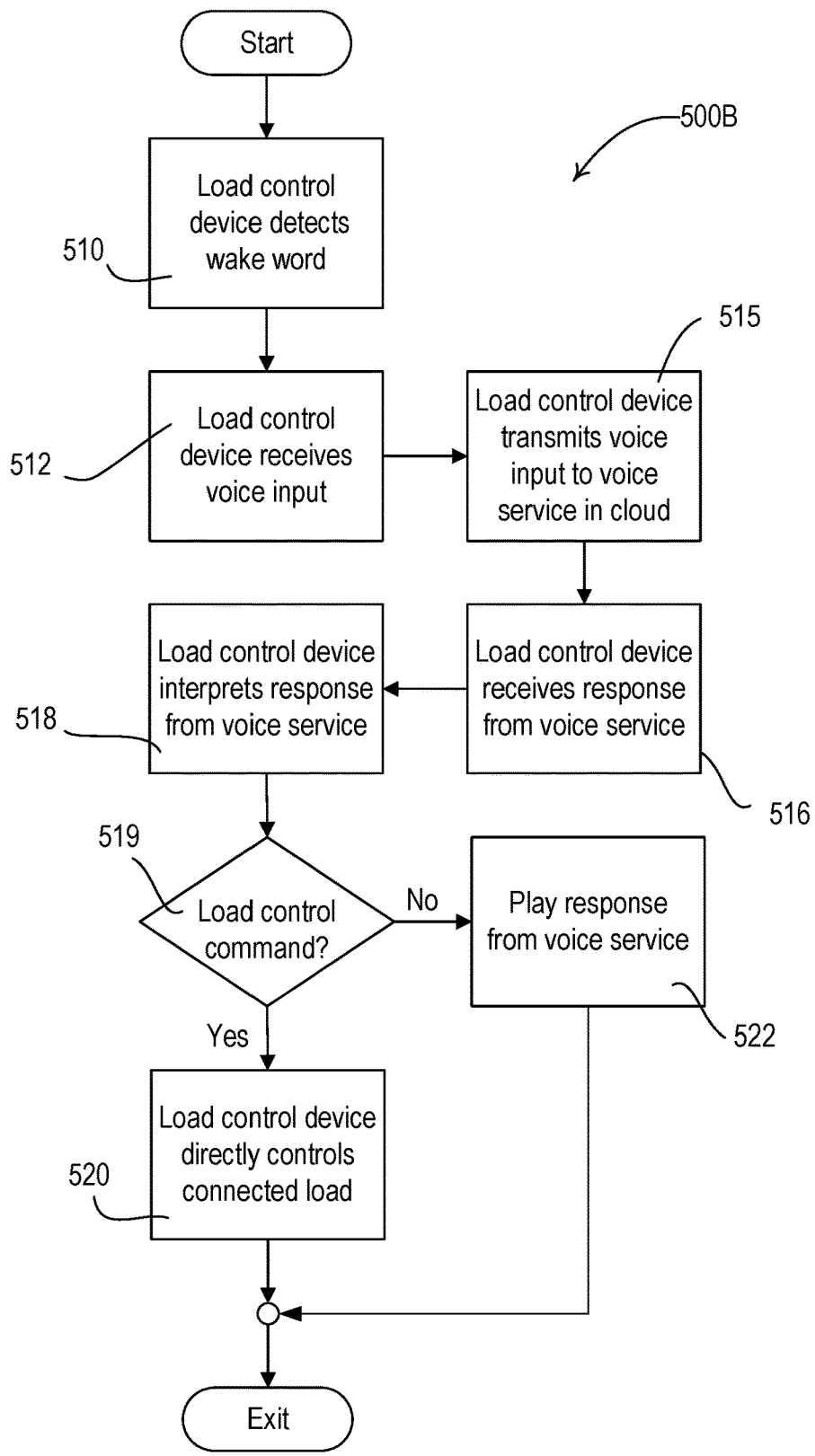

In addition to receiving and responding to vocal load control commands from a user, the load control device may be responsive to other vocal requests. FIG. 5B is a simplified flowchart of an example control procedure 500B that may be executed by a load control device of a load control system to receive and respond to both vocal load control commands and other vocal requests. Steps 510-518 may be the same as steps 510-518 described in FIG. 5A, where the load control device receives voice input, transmits it to the voice service for interpretation, and the load control device then receives and interprets the response from the voice service. For example, the voice service on the cloud server may process the acoustic data and may determine an action based on the voice processing. Based on the action, the cloud server may send a response to the load control device. For example, the command may be "turn on the kitchen lights". The voice service may determine the action "turn on" and the corresponding device for the "kitchen lights", that is, the control device located in the kitchen. The cloud server may then transmit a command to the load control device (e.g., for a load control device with an integrated microphone device, that is, the microphone device which sent the command) for control of the electrical load. At step 519, the load control device may determine whether the response from the voice service comprises a load control command. If the load control device determines the response comprises a load control command, the load control device may directly control the connected electrical load in step 520. For example, the load control command may comprise a digital code comprising one or more specific digits that the load control device may recognize as a load control command. For example, the code 1100100 may mean turn on the lights to 100% intensity. One will understand analog control commands may alternatively be used.

If the load control device determines that the response does not comprise a load control command (i.e., the response is a stream of analog or digital data that is not recognized as a load control command), the load control device may play the received response from the voice service at step 522. For example, the load control device may directly play the received response via one or more speakers. The speakers may be integrated with the load control and/or microphone device, or the speakers may be an external device. For example, the load control device or microphone device may receive the acoustic response from the cloud server and may transmit the response to one or more speakers to be played back to a user. For example, if the voice input was a request for the current weather, the received response may be "it is currently raining", which may be played back by the speakers.

Alternatively, the system controller may receive the response and determine whether to send the response to a load control device or to a speaker, etc. Additionally, the system controller may receive a command from the cloud server (such as a lighting control command, for example, 1100100), and may translate the command to a lighting control command in a different protocol. For example, the system controller may receive the command and may transmit it to a lighting control device using the ClearConnect protocol. Other examples are possible.

Figure 6:
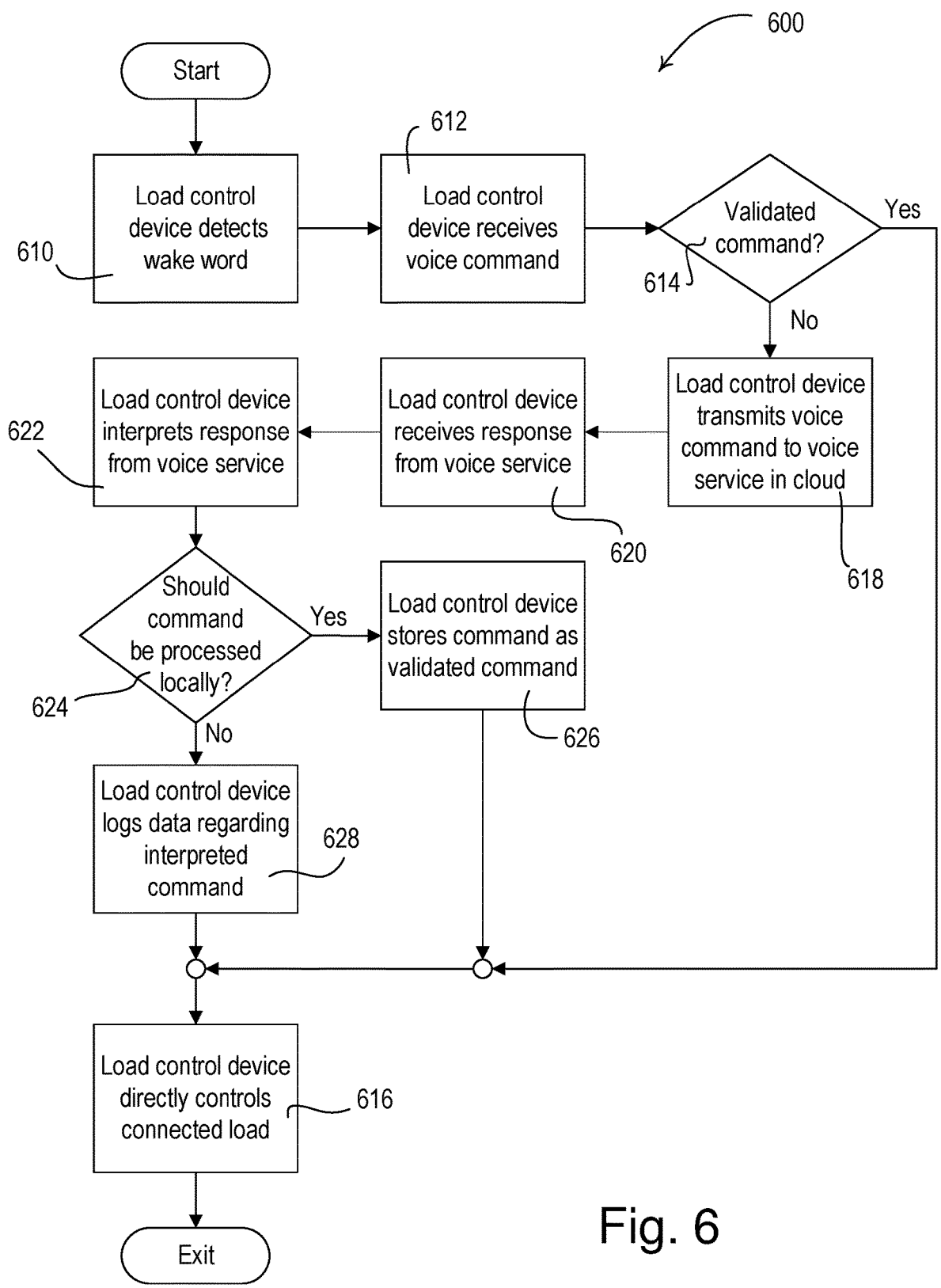

FIG. 6 is a simplified flowchart of an example audio control procedure 600 that may be executed by a load control device of a load control system (e.g., one of the lighting control devices 120 of the load control system 100). In the audio control procedure 600, the load control device may be configured to process some voice commands locally and control the connected electrical load without transmitting the voice command to the voice service in the cloud. This may reduce the latency of the response and further may allow the load control system to process voice commands when the network (i.e., the cloud server) is down or unavailable. When the load control device receives a voice command that is not validated for local processing (that is, the voice command is not one of a list of recognized commands), the load control device may be configured to analyze the voice command to determine if the load control device should begin to process the voice command locally (e.g., if the voice command is one that is received often).

Referring to FIG. 6, the load control device may detect a wake word at step 610 and receive a voice command at step 612. At step 614, the load control device may determine if the voice command is a validated command. A validated command may be a voice command that the load control device recognizes, for example, the validated command may be associated with a corresponding action. For example, a validated command may be a voice command "turn on the lights", which may be associated in memory with the action to turn on the lights. For example, the load control device may compare the received voice command with one or more voice commands stored in memory. If the received voice command matches one of the voice commands stored in memory, the load control device may recognize the voice command, that is, the voice command may be a validated command. For example, the load control device may correlate the voice command with the voice commands stored in memory and determine a match based on a correlation percentage. If the correlation percentage is above a threshold, the load control device may determine that the voice command matches the stored voice command. For example, if the threshold is 90% and the voice command correlates with the stored command by 96%, the load control device may determine that the voice command is a validated command. However, if the correlation is less than 90%, the load control device may determine that the command is not a validated command.

If the received voice command is a validated command at step 614 (e.g., stored in memory in the load control device as described), the load control device may directly control the connected electrical load in response to the received voice command, according the action stored and associated with the validated command. The audio control procedure 600 may then exit. If the received voice command is not a validated command at step 614 (i.e., not stored locally), the load control device may transmit the voice command to a voice service in the cloud at step 618 (e.g., directly to the Internet via the router 114 and/or via the system controller 110). The load control device may receive a response from the voice service at step 620 and interpret the response to determine a load control command (i.e., an action) for controlling the electrical load at step 622.

At step 624, the load control device may determine whether the voice command should be processed locally. For example, if the response from the voice service was a load control command, the load control device may determine whether the received load control command (i.e., action) has been stored in memory. For example, the load control command may be a simple intensity count, such as 00110101, for example, which may indicate to the load control device to set the intensity to 100%. If one or more instances of the received load control command have been stored in memory, the load control device may compare the current voice command with each stored voice command in memory associated with the load control command, as previously described.

Different criteria may be used to determine if the voice command should be processed locally. In a first example, if the voice command is not stored in memory, the load control device may store the voice command in memory as a validated command at step 626, along with the load control command. In this way, a voice command with a corresponding load control command may only need interpreted by a voice service a single time before the load control device may determine that the command should be processed locally at step 624. The load control device may then store the voice command as a validated command and associate the corresponding action to take based on the load control command at step 626.

Alternatively, the load control device may require the voice command to be received multiple number of times, before storing the voice command as a validated command. According to a second example, the load control device may require the voice command to be received three times. (One will recognize any number may be used.) The load control device may store the voice command either in multiple instances in the memory, or record how many times the voice command has been received, before storing the voice command as a validated command. For example, when three instances of the voice command have been received and stored in memory, each voice command having the same corresponding load control command, the load control device may then determine that the command should processed locally. If the load control device determines that the command should be processed locally at step 624, the load control device may store the voice command in memory as a validated command at step 626, along with the load control command.

If the voice command does not match any of the stored voice commands, or if multiple stored commands are required to create a validated command, the load control device may determine that the command should not be processed locally. Otherwise, the load control device may store data regarding the received voice command in memory at step 628 for use when determining if the command should be processed locally in the future. After determining if the received voice command should be processed locally or not at step 624, the load control device may directly control the connected electrical load at step 616 in response to the received voice command, before the audio control procedure 600 exits. Additionally, if the response is an acoustic response to the voice command (e.g., a user has asked a question and the voice service provides a response), the load control device may determine that the voice command should not be processed locally (i.e., an Internet search service may be required to process the request), and the load control device may not store the voice command.

Figure 7:
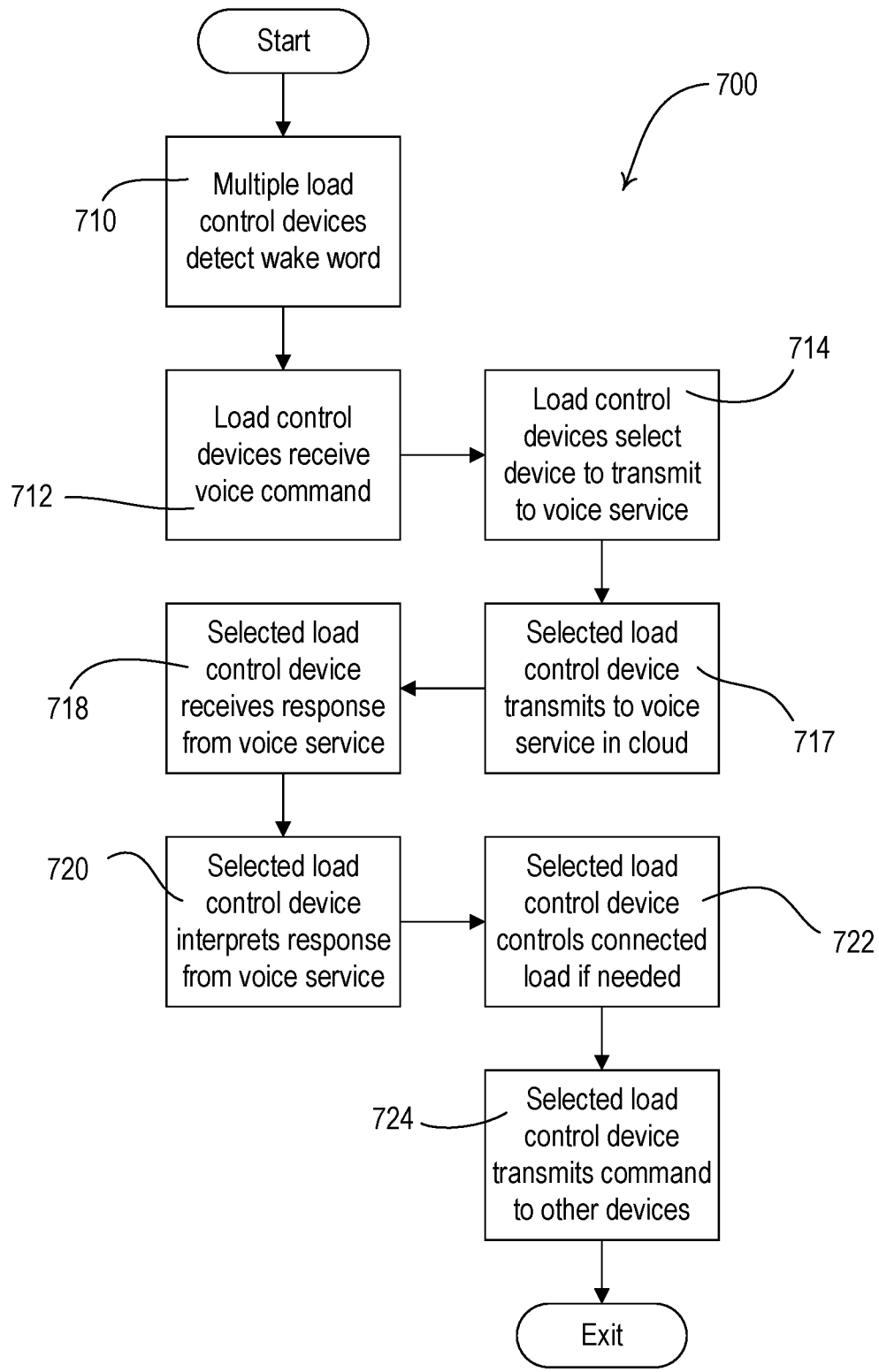

FIG. 7 is a simplified flowchart of an example audio control procedure 700 that may be executed by one or more load control devices of a load control system (e.g., the lighting control devices 120 of the load control system 100). The multiple load control devices of the load control system may be configured to communicate with each other in order to determine how to communicate with a voice service in the cloud and to control the respective electrical loads. One or more of the load control devices may detect a wake word at step 710 and receive a voice command at step 712.

The load control devices may communicate with each other at step 714 in order to determine which one of the load control devices should transmit the voice command to the voice service. For example, the load control devices may determine which load control device heard the voice command the best (e.g., the loudest or closest) at step 714, as previously described for multiple microphone devices. For example, the microphone devices may transmit characteristics of the voice command to each other (for example, volume, multipath interference (e.g., echoes), distance to the sound source, etc.). Each load control device may then compare the characteristic(s) to its own measured characteristic(s). If the load control device determines its own characteristic(s) are not better than the received characteristics(s), the load control device may not transmit the voice command to the server. However, if the load control device determines that its own characteristic(s) are better than the received characteristic(s), the selected load control device may transmit the voice command to the voice service in the cloud at step 717 (e.g., directly to the Internet via the router 109 and/or via the system controller 110). Other examples are possible.

The selected load control device may receive a response from the voice service at step 718 and interpret the response to determine a load control command for controlling the electrical load(s) at step 720 (as similarly described with respect to FIGS. 5A, 5B). The selected load control device may directly control its connected electrical load in response to the interpreted command at step 722 (if needed) and/or may transmit the interpreted command to the other load control devices at step 724, which may in turn control their loads. According to a first example, the load control device may transmit the command to all of the load control devices which heard the voice command. For example, the load control device may transmit the load control command to each load control device it received a communication from at step 714. In a second example, the load control command may be a scene command. The load control device may then transmit the scene command to other load control devices in the load control system. The other load control devices in the load control system may or may not be microphone devices. The other load control devices may determine whether to control their respective electrical loads based on the scene command. For example, the load control device may transmit a "morning" scene command to one or more load control devices, such as a motorized window treatment. The motorized window treatment may receive the scene command and may adjust a respective window covering based on the scene command, for example, the motorized window treatment may raise the window covering to fully open, while one or more lighting control devices may turn off their respective lighting loads in response to the "morning" scene". Other examples are possible. After controlling the electrical loads, the audio control procedure 700 may then exit.

Figure 8:
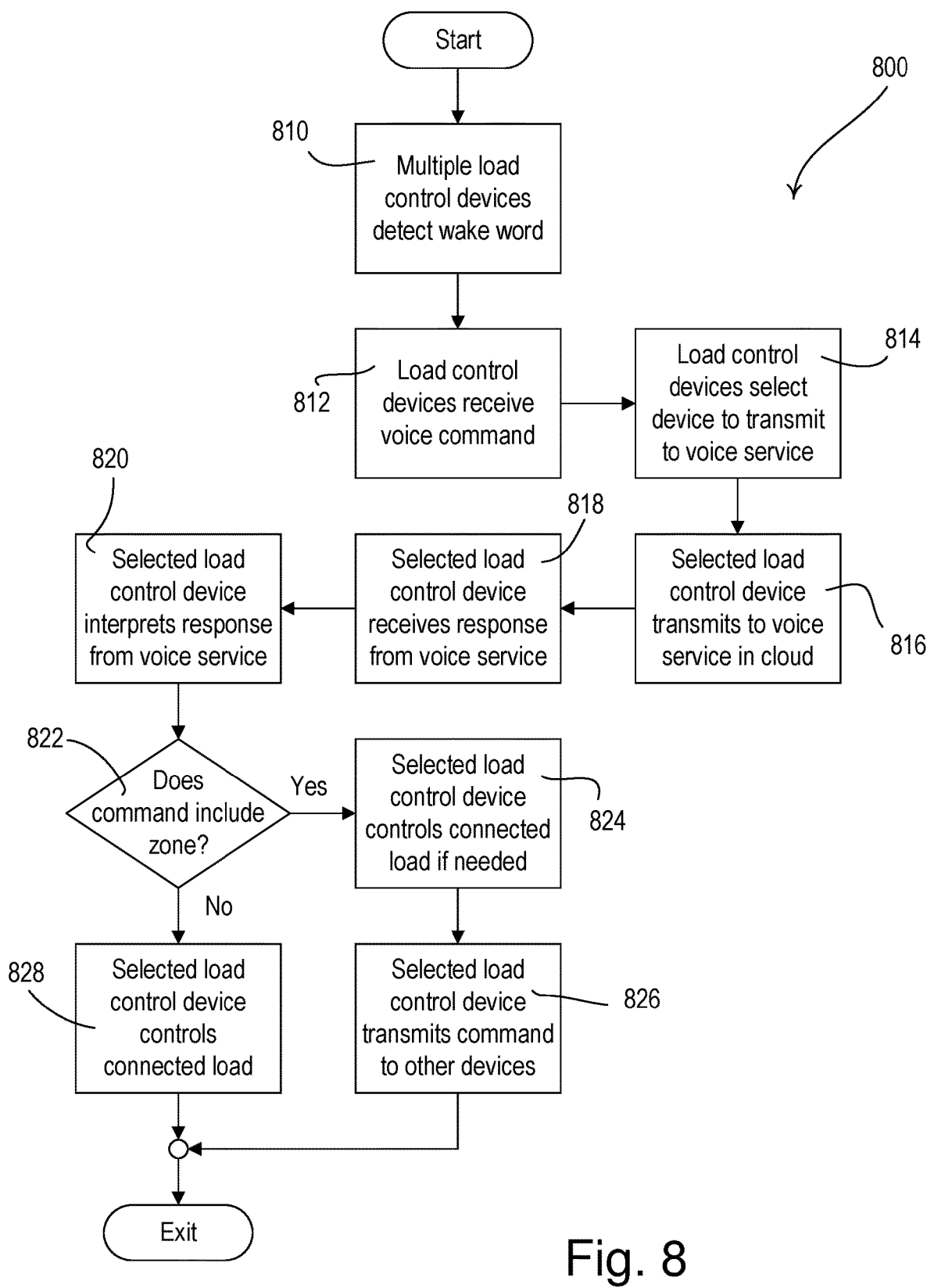

FIG. 8 is a flowchart of another example audio control procedure 800 that may be executed by one or more load control devices of a load control system (e.g., the lighting control devices 120 of the load control system 100). Using the audio control procedure 800, each load control device may be configured to determine which load control devices to control depending on whether the received command includes information regarding a zone (e.g., one or more load control devices in an area) to be controlled. For example, if the user states "Alexa, turn on the kitchen lights", the voice service may interpret the voice command as "turn on" and the zone as "kitchen". The cloud server may then translate the voice command and zone into a format recognizable to the load control system. The load control devices may receive the response from the cloud server including the command "turn on" and the zone "kitchen", and the load control devices may be configured to determine that the desired zone is the kitchen lights. However, if the user simply states "Alexa, turn on the lights", the load control devices may determine that the desired zone is the load control device that heard the voice command the best (e.g., the loudest or closest).

Referring to FIG. 8, one or more of the load control devices may detect a wake word at step 810 and receive a voice command at step 812. The load control devices may communicate with each other at step 814 in order to determine which one of the load control devices should transmit the voice command to the voice service, e.g., the load control device that heard the voice command the best, as previously described in FIG. 7. Other examples are possible. The selected load control device may transmit the voice command to the voice service in the cloud at step 816 (e.g., directly to the Internet via the router 114 and/or via the system controller 110). The selected load control device may receive a response from the voice service at step 818 and interpret the response to determine a load control command for controlling the electrical load(s) at step 820 (for example, as described in FIGS. 5A and 5B).

At step 822, the selected load control device may determine whether or not the response command from the voice service includes zone information. For example, the received command may be "lights on" with a zone of "kitchen". If the received command includes information indicating a zone to be controlled at step 822, the load control device may directly control its connected electrical load in response to the interpreted command at step 824 (if needed) and may transmit the received command to the other load control devices at step 826, before the audio control procedure 800 exits. For example, if the command from the voice service includes zone information, each load control device may know which zone it controls via configuration information. The selected load control device may then determine whether the zone control information matches its own zone information, and if it does, the selected load control device may then control its connected load at step 824. However, if the zone control information is for a zone which another load control device controls, the selected load control device not control its electrical the load. The selected load control device may transmit the command including the zone control command to the other load control devices in the load control system at step 826. For example, the other load control devices may then receive the zone control command and determine whether to control their connected electrical load based on the zone control command and their specific configuration.

Alternatively/in addition, the system controller may determine zone information. For example, the system controller may be configured to know what devices are in which zones, based on configuration data established during setup of a load control system. For example, the selected load control device may transmit the zone control information and the load control command from the voice service to the system controller. The system controller may determine which load control device(s) correspond to the respective zone control information, and may then transmit the load control command to the one or more load control devices associated with the respective zone control command. These devices may then control their respective loads accordingly.

Alternatively, if the received command does not include information regarding a desired zone to be controlled, the selected load control device (e.g., the load control device that received the voice command the best) may interpret the response to determine a load control command. The selected load control device may directly control the connected electrical load in response to the interpreted command at step 828. The audio control procedure 800 may exit.

One will understand that other examples are possible. For example, when the load control command does not include zone information, the selected load control device may still transmit the load control command to one or more other load control devices. For example, the command may be a scene, which includes multiple load control devices adjusting their respective loads. In this case, the selected load control device may transmit the command to the system controller and/or one or more load control devices which may interpret the load control or scene command. For example, the response from the voice service include an action that is a scene. The scene may be received by the selected load control device. The selected control device may translate the scene action into a load control command to the load control system. The other load control devices in the load control system may receive the scene command and determine whether or not to control their respective loads based on whether the load control device has been programmed to respond to the specific scene during configuration of the load control system. Alternatively, the selected load control device may transmit the scene command and/or the response from the voice service to the system controller. The system controller may then transmit corresponding scene or load control commands to the load control system and/or individual load control devices.

In another example, although described here as a load control device, one will recognize a standalone microphone device which is not a load control device may be used to receive the load control command from the voice service. Therefore, if the selected device is a standalone microphone device which receives a load control command not including zone information, the selected microphone device may then transmit the load control command to the system controller and/or load control devices in the same room as the selected microphone device. For example, the system controller may determine which load control device(s) are in the same zone or area as the selected microphone device (based on information from a room setup obtained during system setup of the load control system and microphone devices), and may transmit the control command to the respective load control device(s). For example, the selected microphone device may transmit the received response from the voice service to the system controller, and/or may transmit an interpreted response the system controller. The system controller may receive the interpreted response, or may interpret the received response, and may determine which load control devices are in the same room as the microphone device. The system controller may then transmit one or more load control commands to one or more load control devices in the same room as the selected microphone device. Or, the selected microphone device may know which load control devices are in the same room and may transmit the interpreted command directly to the load control devices within the same room.

Figure 9:
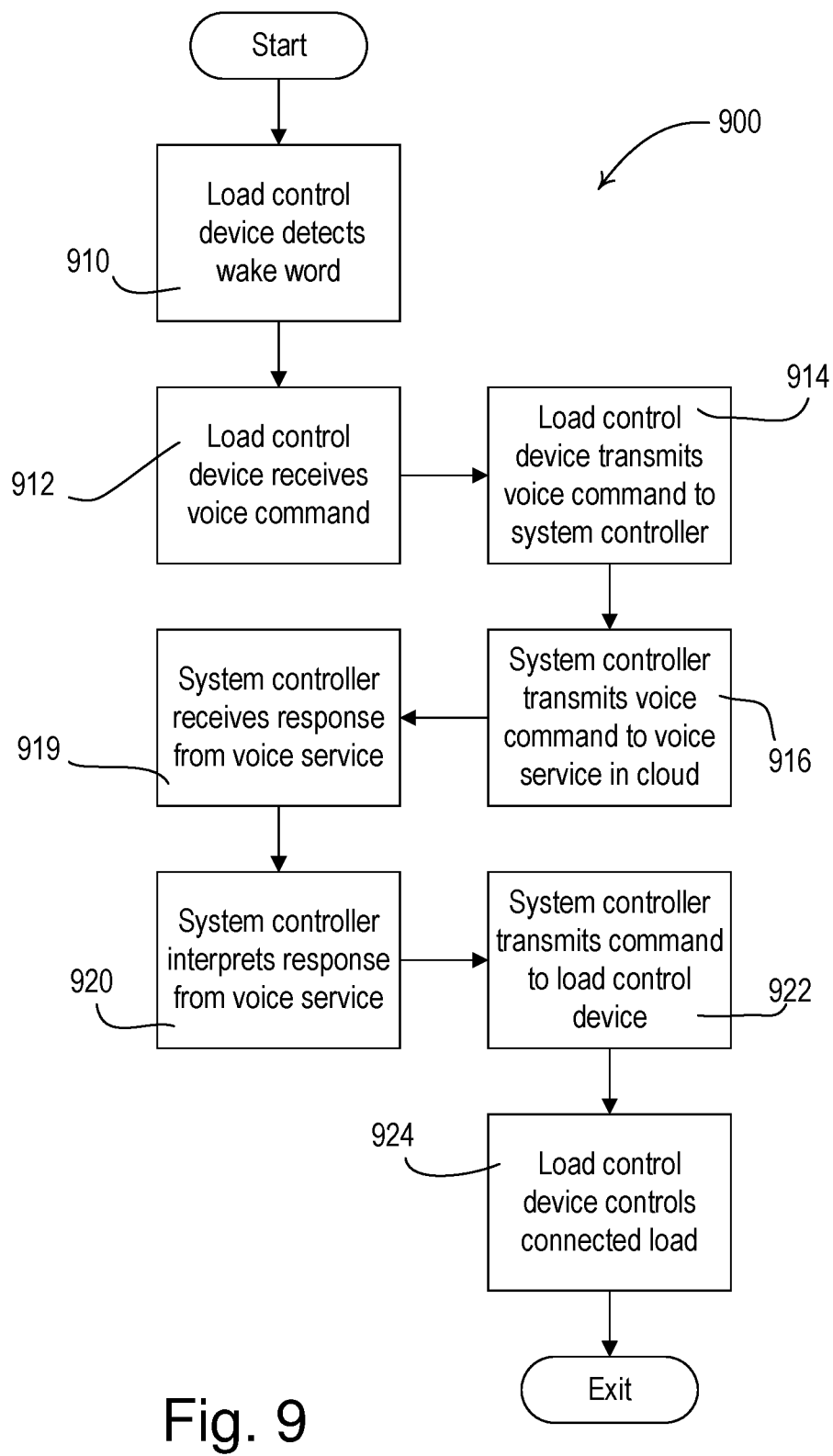

FIG. 9 is an example audio control procedure 900 that may be executed by a load control device (e.g., one of the lighting control devices 120) and/or a system controller (e.g., the system controller 150) of a load control system (e.g., the load control system 100). The load control device may comprise a microphone for receiving audio data (e.g., voice commands and/or sounds). The load control device may be configured to transmit the audio data to the system controller, which may be configured to communicate with the voice service in the cloud to allow for controlling the electrical load connected to the load control device. After detecting a wake word at step 910, the load control device may receive a voice command at step 912. The load control device may transmit the voice command to the system controller at step 914 and the system controller may transmit the voice command to the voice service in the cloud at step 916. The system controller may receive a response from the voice service at step 919 and interpret the response to determine a load control command for controlling the electrical load at step 920. At step 922, the system controller may transmit the interpreted command to the load control device. For example, the system controller may use zone information in the received interpreted command to determine which load control device(s) to send the interpreted command to. For example, the system controller may determine which devices correlate to the received zone, and may control the devices in that zone based on the interpreted command. In another example, the system controller may transmit the interpreted command to the load control device which it received the voice command from, and/or the load control device which heard the voice command the best, as previously described. Alternatively, if the interpreted command is a scene command, the system controller may recognize the scene command and transmit load control commands to the respective load control devices to create the desired scene. At step 924, the load control device(s) may then directly control the connected electrical load in response to the interpreted command received from the voice service. The audio control procedure 900 may then exit.

Figure 10A:
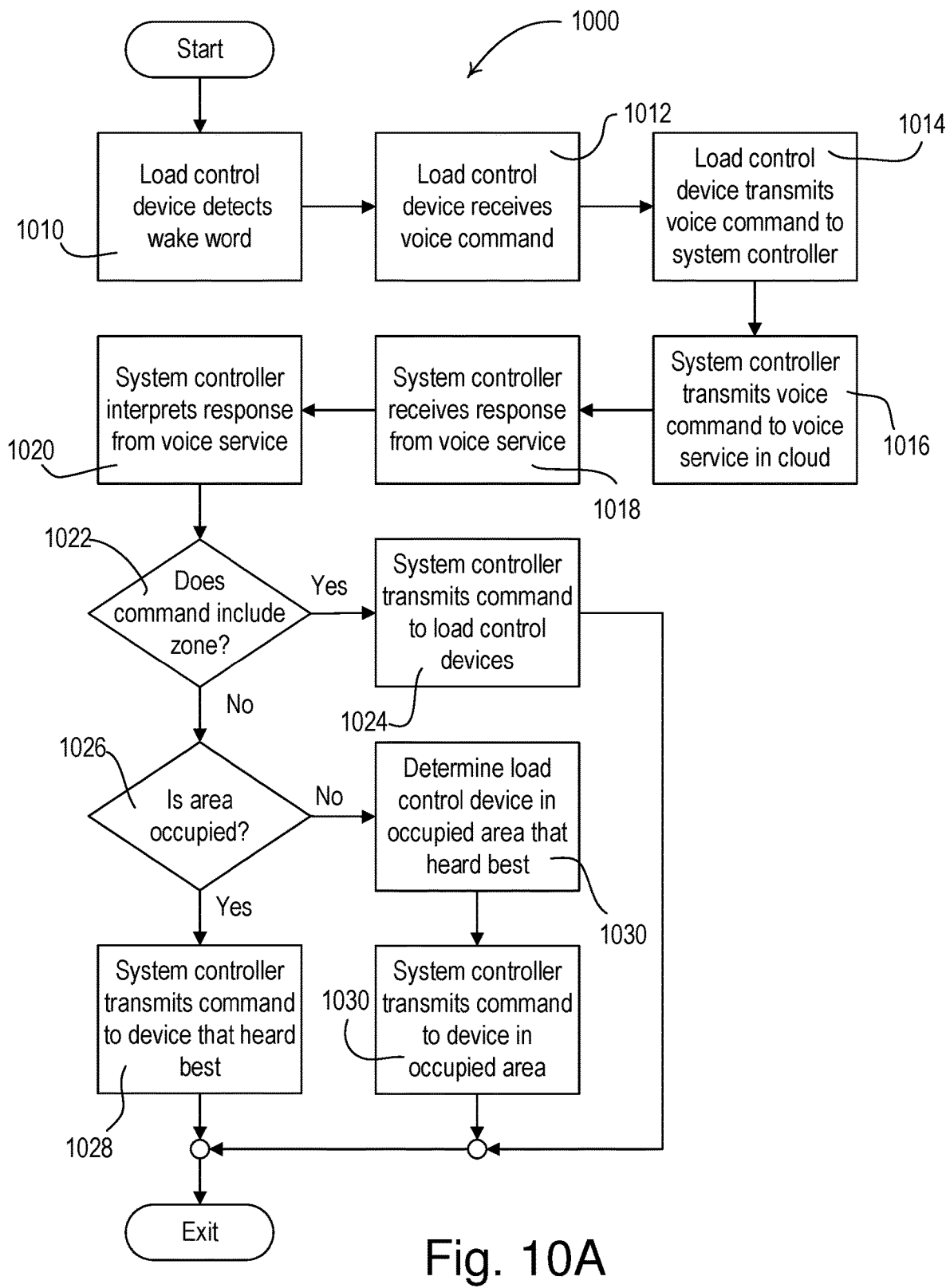

FIG. 10A is a flowchart of an example audio control procedure 1000 that may be executed by a load control device (e.g., one of the lighting control devices 120) and/or a system controller (e.g., the system controller 150) of a load control system (e.g., the load control system 100). The load control device may comprise a microphone for receiving audio data (e.g., voice commands and/or sounds). The load control device may be configured to transmit the audio data to the system controller, which may be configured to communicate with the voice service in the cloud to allow for controlling the electrical load connected to the load control device. After detecting a wake word at step 1010, the load control device may receive a voice command at step 1012. The load control device may transmit the voice command to the system controller at step 1014. The system controller may then transmit the voice command received from the load control device to one or more voice services in the cloud at step 1016. One will understand that any or multiple voice services may be used, or the voice service may be selectable, as previously described. After the voice service has processed the audio data of the voice command, the system controller may receive a response from the voice service at step 1018. At step 1020, the system controller may interpret the response to determine a command for controlling the electrical load at step 1020.

If the received command includes information indicating a zone to be controlled at step 1022, the system controller may transmit the interpreted command to the respective load control device(s) for that zone. For example, the system controller may maintain a configuration database that associates load control devices with zones which may be used to determine which load control devices to transmit the interpreted commands to for a respective zone. For example, the configuration database may be created during a configuration state of the load control system. Additionally and/or alternatively, the system controller may also have a configuration database for one or more scenes, which may also be configured during a configuration or setup state of the load control system, wherein each scene is associated with respective lighting controls. The load control device may then directly control the connected electrical load in response to the interpreted command at step 1024, before the audio control procedure 1000 exits.

If the received command does not include information indicating a zone to be controlled at step 1022 and the area in which the load control device that heard the audio command best is occupied at step 1026, the system controller may transmit the interpreted command to the load control device that heard the audio command best at step 1028. The load control device that heard the audio command the best may be associated with a zone. The system controller may additionally, or alternatively, determine which load control devices are included in the same zone as the load control device that heard the audio command the best. The system controller may then transmit a load control command based on the interpreted command to one or more load control devices in the same zone as the load control device that heard the audio command the best. For example, additional load control devices, which may not be microphone devices, may be located in a same zone as the load control device that heard the audio command the best. In this way, the system controller may transmit the command to all the load control devices in the zone. The audio control procedure 1000 may then exit. If the area in which the load control device that heard the audio command best is not occupied at step 1026, the system controller may determine which load control device in an occupied area heard the audio command the best at step 1030. The system controller may then transmit the interpreted command to that load control device (or the load control devices in the same zone, as previously described) at step 1032, before the audio control procedure 1000 exits.

Figure 10B:
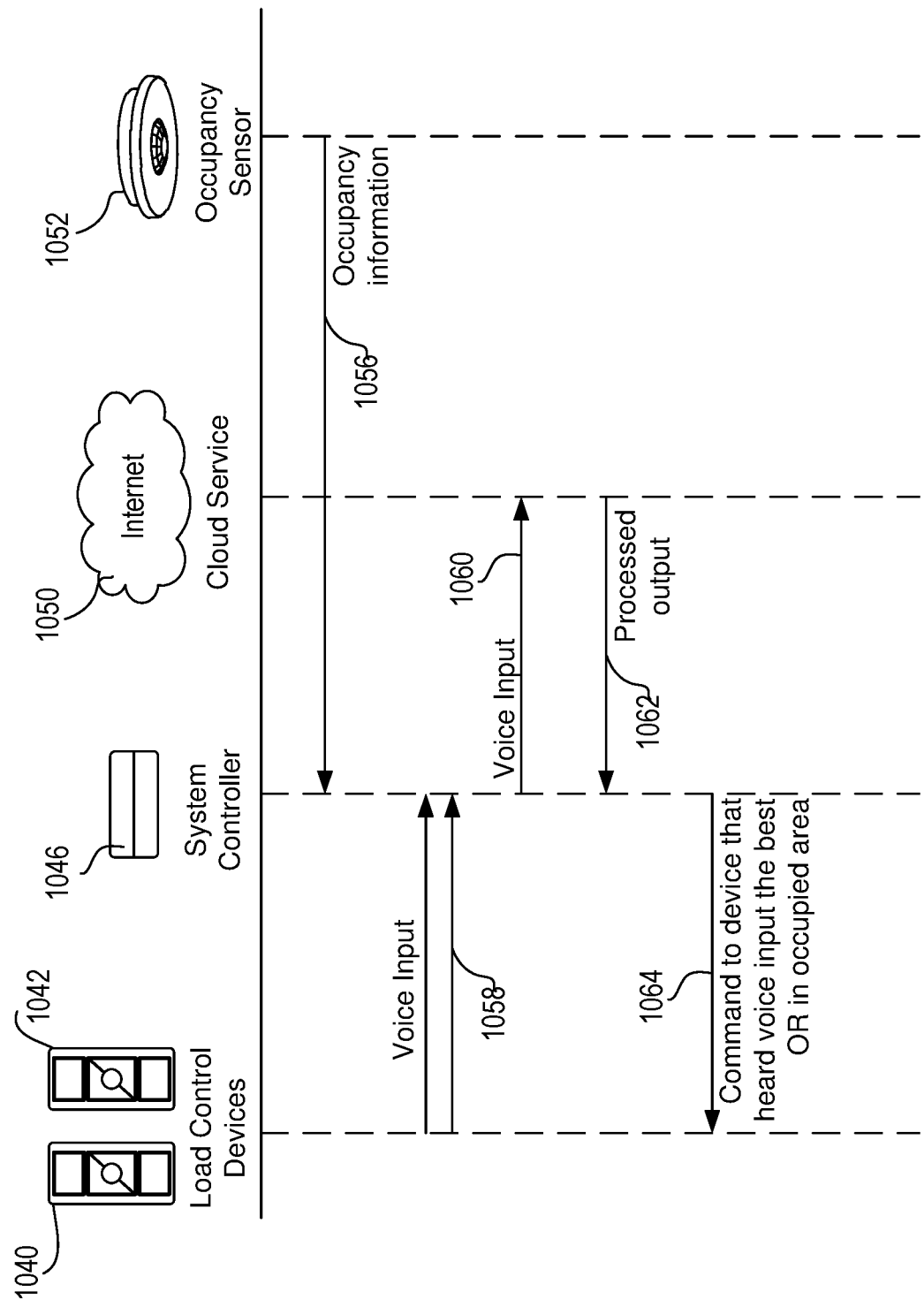

FIG. 10B is a message flow diagram similar to the flowchart shown in FIG. 10A. One or more devices may send commands or messages to each other. For example, a load control system may have one or more load control devices 1040, 1042, a system controller 1046, and one or more occupancy sensors 1052. Any or all of these devices may communicate with a cloud service 1050 on the Internet.

For example, one or more occupancy sensors 1052 may transmit occupancy information 1056 to the system controller 1046. The system controller 1046 may use the occupancy information 1056 to maintain an occupancy status for one or more areas associated with the one or more occupancy sensors 1052. The system controller 1046 may also control one or more load control devices based on the occupancy information.

When a user speaks a wake word, one or more load control devices 1040, 1042 may hear the wake word and record voice input 1058 following the wake word. The one or more load control devices may transmit the voice input 1058 to the system controller 1046 for processing. The system controller may process the voice input 1058 locally. For example, the system controller may process the voice inputs 1058 to determine which voice input has a better audio quality. The audio quality may be based on a signal to noise ratio, volume, multipath reflections, etc., as previously described. The system controller 1046 may then transmit the voice input 1060 having better audio quality to the cloud service 1050 for voice processing.

The cloud service 1050 may process the voice input 1060 and may return a processed output 1062 to the system controller. The processed output may be a load control command. For example, the processed output may be an instruction to turn a specific lighting load or zone on or off. For example, if the voice input was "turn on the kitchen lights", the cloud service may digitally instruct the system controller 1046 to turn on the lighting loads in the kitchen. The system controller may then translate the instructions into commands for one or more load control devices. Alternatively, if the voice input 1060 was a request that was not associated with controlling a load, the cloud service 1050 may respond with an answer to the request in the form of acoustic data. The system controller 1046 may receive the acoustic data and transmit it directly to one or more load control devices, or to one or more speakers.

The system controller 1046 may determine to transmit the command or acoustic data to one or more load control devices based on one or more parameters. That is, the system controller may attempt to send the command or acoustic data to the load control device located in the area that the user made the request. For example, the system controller 1046 may transmit the command to the load control device that heard the voice input the best. For example, if the voice input 1060 transmitted to the cloud service 1050 was received from the load control device 1040 (and the redundant voice input 1058 from the load control device 1042 was ignored), the system controller may return the command 1064 to the load control device 1040 and/or any devices in the same zone as the load control device 1040. In this way, the load control device 1040 may respond to the command.

Additionally or alternatively, the system controller may use the occupancy information 1056 to transmit commands to the load control devices. For example, if both areas are occupied where the load control devices 1040, 1042 are located, the system controller may transmit the command to both of the load control devices. However, if only one of the areas is occupied, for example, the system controller may transmit the command to just the occupied area. For example, the system controller may transmit the command 1064 to just the load control device 1042. Although it has been described herein as the system controller transmits a command to a load control device in an occupied area, there may be multiple load control devices in the occupied area. For example, the example of a single load control device in an area is for descriptive purposes only, and one will recognize that the system controller may transmit the command to any or all load control devices in an occupied area.

Although this method has been described herein as using a system controller, one will understand that systems may be designed which do not require the use of a system controller. For example, the load control devices 1040, 1042 may communicate wirelessly or via a wired connection (e.g., power line communication) to receive occupancy information 1056 and/or determine which load control device heard the voice input the best, thereby consuming the role of the system controller between themselves. Additionally or alternatively, the load control devices themselves may contain occupancy sensors. Other variations are possible.

Figure 11:
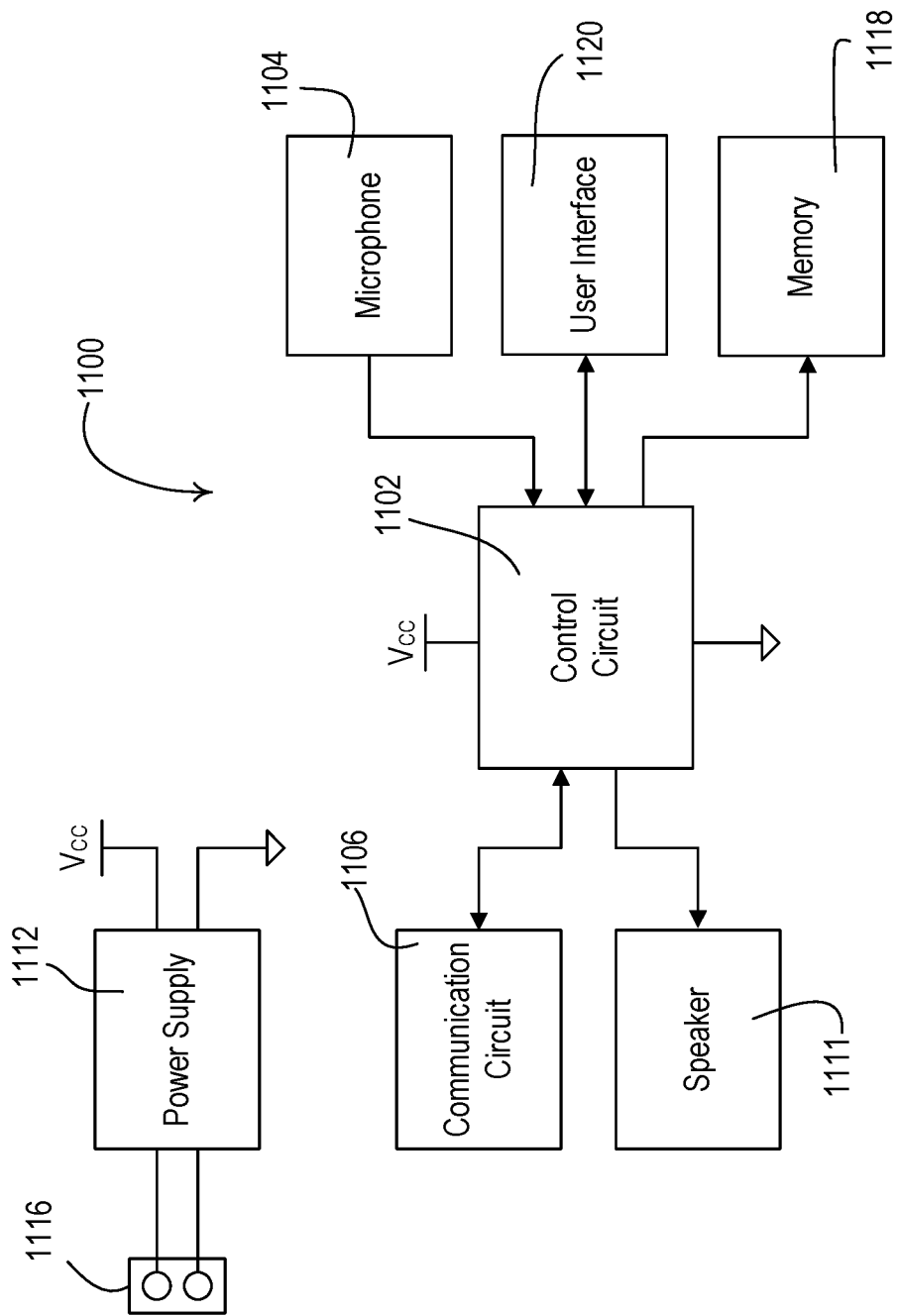
FIG. 11 is a block diagram of an example control device (e.g., a wall-mounted keypad) that may be configured as a microphone device

FIG. 11 is a simplified block diagram of an example control device 1100 that may be configured as a microphone device and may deployed as, for example, the wall-mounted keypad 176 of the load control system 110 shown in FIG. 1. The control device 1100 may be powered by a power supply 1112 that may receive power from a power connection 1116, which may receive power from an external alternating-current (AC) power supply or an external direct-current (DC) power supply. The power supply 1112 may provide an output DC supply voltage $V_{CC}$ for powering a control circuit 1102. The control device 1102 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1002). The control circuit 1102 may be configured to execute one or more software-based applications that include instructions that when executed by the control circuit may configure the control circuit to perform signal coding, data processing, power control, input/output processing, or any other functionality that enables the control device 1100 to perform as described herein. One will recognize that features and processes described herein may also and/or alternatively be provided by firmware and/or hardware in addition to/as an alternative to software-based instructions.

The control circuit 1102 may store information in and/or retrieve information from the memory 1118. Memory 1118 may also store software-based instructions for execution by the control circuit 1102 and may also provide an execution space as the control circuit executes instructions. Memory 1118 may be implemented as an external integrated circuit (IC) or as an internal circuit of the control circuit 1102. Memory 1118 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control device 1100 may also include one or more communication circuits 1106 for transmitting and/or receiving wireless and/or wired communication. The control device 1100 may comprise a user interface 1120 coupled to the control circuit 1102 for receiving user inputs and displaying feedback information.

The control circuit 1102 may be adapted to receive audio signals from an input microphone 1104 and determine how to process the audio signals as described herein. The control circuit 1102 may be configured to detect a wake word spoken by a user of the control device 1100, for example, by comparing the audio data to one or more predetermined wake words stored in the memory 1118. The control circuit may send or receive commands related to controlling electrical loads, such as a lighting load, for example, or for sending acoustic data to a system controller or a remote network server for further audio data processing. The remote network server may be a cloud server. The control circuit may communicate to the remote network via one or more intermediary devices, such as a system controller, and/or a router device. The communication protocol may include one or more of the following: Wi-Fi, HaLow, ZigBee, Bluetooth, Z-Wave, ClearConnect, or other similar protocols.

The input microphone 1104 may be a digital or analog MEMs device, which are available at low-cost and in small package sizes. However, electret condenser, magnetic, or other broadband acoustic input devices available in a suitably small package size may alternatively be used, for example. The microphone device may include multiple input microphones, which may be physically spaced apart from one another. Multiple input microphones may allow for improved ambient noise rejection, and may also allow for acoustic beam-forming or beam-steering, whereby the microphone device is directionally sensitive to input sounds.

The control device 1100 may also include a speaker 1111 coupled to the control circuit 1102 for allowing for communication with the user. The speaker may allow the microphone device to communicate audibly with a user, or may be used to play music. The control circuit 1102 may be configured to cause the speaker 1111 to generate audio signals, for example, in response to data received from the voice service in the cloud. For example, the data received from the voice service in the cloud may indicate an answer to a question asked by the user of the control device 1100 and the control circuit 1102 may be configured to cause the speaker 1111 to broadcast the answer for the use.

The control device 1100 may include additional circuitry not shown here, including, but not limited to: load control, passive infrared occupancy sensing, microwave occupancy sensing, ambient light sensing, timeclock or time-of-day tracking, and the like.

Figure 12:
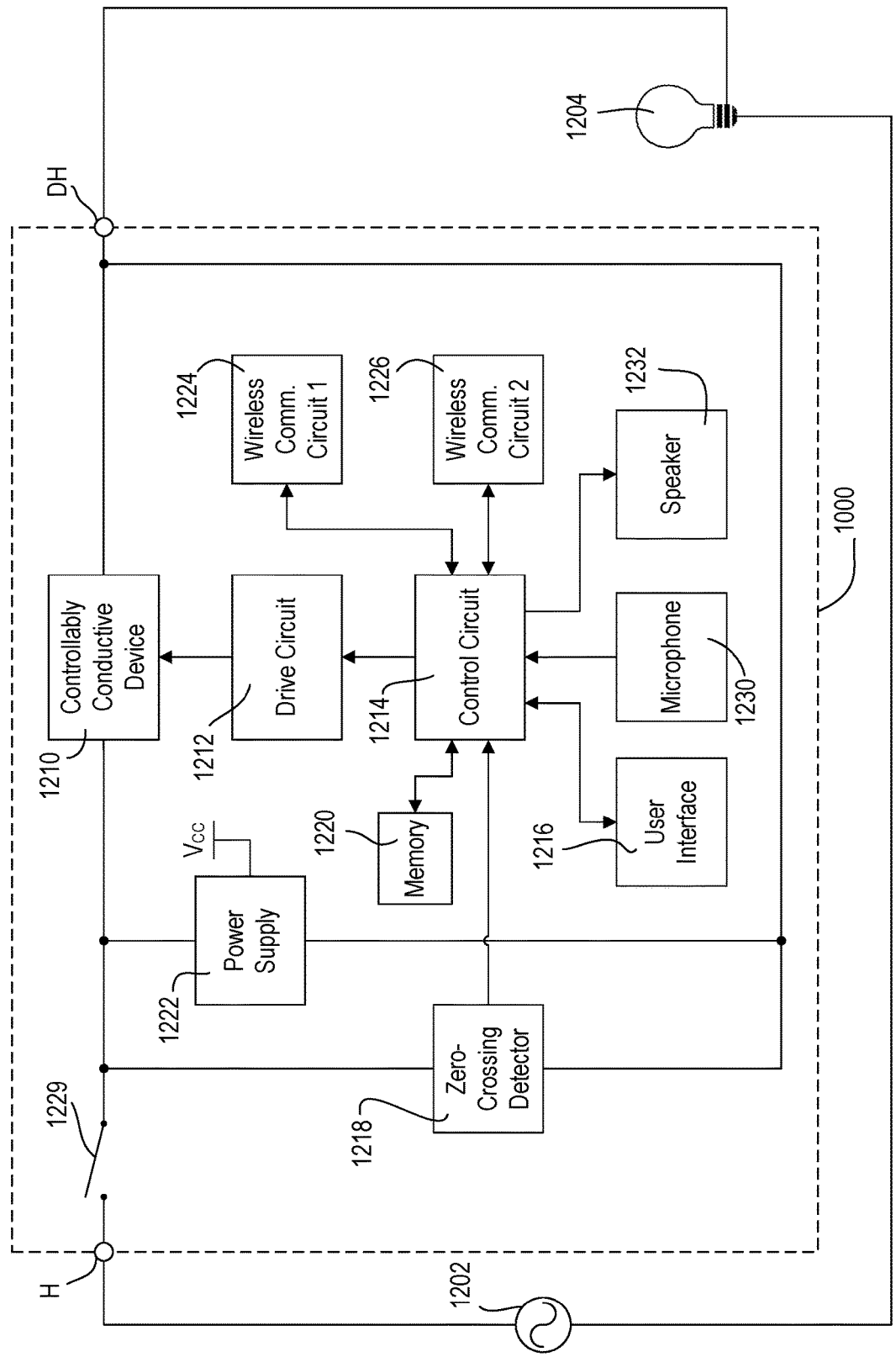
FIG. 12 is a block diagram of an example load control device (e.g., a wall-mounted lighting control device) that may be configured as a microphone device.

FIG. 12 is a simplified block diagram of an example load control device 1200 that may be deployed as, for example, the lighting control devices 120 of the load control system 100 shown in FIG. 1, although it may control other types of electrical loads. The load control device 1200 may include a hot terminal H that may be adapted to be coupled to an AC power source 1202. The load control device 1200 may include a dimmed hot terminal DH that may be adapted to be coupled to an electrical load, such as a lighting load 1204. The load control device 1200 may include a controllably conductive device 1210 coupled in series electrical connection between the AC power source 1202 and the lighting load 1204. The controllably conductive device 1210 may control the power delivered to the lighting load. The controllably conductive device 1210 may include a suitable type of bidirectional semiconductor switch, such as, for example, a triac, a field-effect transistor (FET) in a rectifier bridge, two FETs in anti-series connection, or one or more insulated-gate bipolar junction transistors (IGBTs). An air-gap switch 1229 may be coupled in series with the controllably conductive device 1210. The air-gap switch 1229 may be opened and closed in response to actuations of an air-gap actuator. When the air-gap switch 1229 is closed, the controllably conductive device 1210 is operable to conduct current to the load. When the air-gap switch 1229 is open, the lighting load 1204 is disconnected from the AC power source 1202. The load control device 1200 may include a control circuit 1214. The control device 1102 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1214). The control circuit 1214 may be configured to execute one or more software-based applications that include instructions that when executed by the control circuit may configure the control circuit to perform signal coding, data processing, power control, input/output processing, or any other functionality that enables the load control device 1200 to perform as described herein. One will recognize that features and processes described herein may also and/or alternatively be provided by firmware and/or hardware in addition to/as an alternative to software-based instructions. The control circuit 1214 may store information in and/or retrieve information from the memory 1220. Memory 1220 may also store software-based instructions for execution by the control circuit 1214 and may also provide an execution space as the control circuit executes instructions. Memory 1220 may be implemented as an external integrated circuit (IC) or as an internal circuit of the control circuit 1214. Memory 1220 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control circuit 1214 may be operatively coupled to a control input of the controllably conductive device 1210, for example, via a gate drive circuit 1212. The control circuit 1214 may be used for rendering the controllably conductive device 1210 conductive or non-conductive, for example, to control the amount of power delivered to the lighting load 1204.

The load control device 1200 may comprise a user interface 1216 coupled to the control circuit 1214 for receiving user inputs and displaying feedback information. The control circuit 1214 may receive inputs in response to actuations of buttons of the user interface 1216, and may control the controllably conductive device 1210 to adjust the intensity of the lighting load 1204 in response to the actuations. The control circuit 1214 may be configured to illuminate visual indicators (e.g., LEDs) of the user interface 1216 to provide feedback of the present intensity of the lighting load 1204.

The control circuit 1214 may receive a control signal representative of the zero-crossing points of the AC main line voltage of the AC power source 1202 from a zero-crossing detector 1218. The control circuit 1214 may be operable to render the controllably conductive device 1210 conductive and/or non-conductive at predetermined times relative to the zero-crossing points of the AC waveform using a phase-control dimming technique. Examples of dimmers are described in greater detail in commonly-assigned U.S. Pat. No. 7,242,150, issued Jul. 10, 2007, entitled "Dimmer Having a Power Supply Monitoring Circuit"; U.S. Pat. No. 7,546,473, issued Jun. 9, 2009, entitled "Dimmer having a microprocessor-controlled power supply"; and U.S. Pat. No. 8,664,881, issued Mar. 4, 2014, entitled "Two-wire dimmer switch for low-power loads", the entire disclosures of which are hereby incorporated by reference.

The load control device 1200 may include a power supply 1222. The power supply 1222 may generate a direct-current (DC) supply voltage $V_{CC}$ for powering the control circuit 1214 and the other low-voltage circuitry of the load control device 1200. The power supply 1222 may be coupled in parallel with the controllably conductive device 1210. The power supply 1222 may be operable to conduct a charging current through the lighting load 1204 to generate the DC supply voltage $V_{CC}$.

The load control device 1200 may comprise a first and second wireless communication circuits 1224, 1226, although one or more of communication circuits 1224, 1226 may be configured to communicate over wired networks. Each of the wireless communication circuits 1224, 1226 may include for example, a radio-frequency (RF) transceiver coupled to an antenna for transmitting and/or receiving RF signals. The wireless communication circuits 1224, 1226 may each also include an RF transmitter for transmitting RF signals, an RF receiver for receiving RF signals, or an infrared (IR) transmitter and/or receiver for transmitting and/or receiving IR signals.

The control circuit 1214 may be coupled to the first and second wireless communication circuits 1224, 1226 for transmitting and/or receiving digital messages via the RF signals. The control circuit 1214 may be configured to communicate RF signals (e.g., the wireless communication signals 108) via the first wireless communication circuit 1224 using a first wireless protocol, e.g., a proprietary communication protocol, such as the ClearConnect protocol. The control circuit 1214 may be configured to receive load control commands for controlling the lighting load 1204 in digital messages communicated using the first wireless communication circuit 1224 and may be configured to control the controllably conductive device 1210 to adjust the intensity of the lighting load 1204 in response to the digital messages received via the first wireless communication circuit 1224. The control circuit 1214 may be configured to transmit feedback information (e.g., regarding the amount of power being delivered to the lighting load 1204) via the digital messages communicated using the first wireless communication circuit 1224. The control circuit 1214 may be configured to communicate RF signals (e.g., the wireless communication signals 109) via the second wireless communication circuit 1226 using a second wireless protocol, e.g., a standard communication protocol, such as the Wi-Fi or Bluetooth protocol. For example, the control circuit 1214 may be configured to communicate audio data (e.g., voice commands) in digital messages communicated using the second wireless communication circuit 1226 (as will be described in greater detail below).

The load control device 1200 may further comprise a microphone 1230 coupled to the control circuit 1214 for receiving audio data (e.g., voice commands). The control circuit 1214 may be configured to detect a wake word spoken by a user of the load control device 1200, for example, by comparing the audio data to one or more predetermined wake words stored in the memory 1220. The control circuit 1214 may be configured to transmit the audio data in digital messages communicated using the second wireless communication circuit 1226 (e.g., to the system controller 120). The control circuit 1214 may also be configured to transmit the audio data directly to a voice service in the cloud using the second wireless communication circuit 1226 (e.g., via the router 124). The control circuit 1214 may be configured to receive load control commands via digital messages received via the first or second wireless communication circuits 1226 in response to the transmitted audio data.

In addition, the control circuit 1214 may be configured to compare the received audio data to one or more voice commands stored the memory 1220 and control the controllably conductive device 1210 to adjust the intensity of the lighting load 1204 without transmitting the audio data to the voice service in the cloud.

A user may open the air-gap switch 1229, such that the control circuit 1214 is not able to receive audio data from the microphone 1230.

The load control device 1200 may also comprise a speaker 1232 coupled to the control circuit 1214. The control circuit 1214 may be configured to cause the speaker 1232 to generate audio signals, for example, in response to data received from the voice service in the cloud. For example, the data received from the voice service in the cloud may indicate an answer to a question asked by the user of the load control device 1200 and the control circuit 1214 may be configured to cause the speaker 1232 to broadcast the answer for the user.

In addition to the embodiments described herein, a microphone device may provide an indication to a user when the microphone device is transmitting data to a cloud server. For example, voice integration devices typically use one or more light emitting diodes (LED) which light up on the device when a user says a wake word. However, as the microphone devices may be placed anywhere in the room (i.e., on the wall, ceiling, etc.), an LED indicator on the device may not be adequate to alert a user that the device is listening.

To alert a user that one or more microphone devices are listening in response to a wake word, a lighting control device may blink a connected lighting load in response to detecting a keyword (e.g., a wake word) and continue to blink the connected lighting load while the microphone device is recording audio data. For example, the microphone may be integrated with the load control device, or the microphone device may be separate from the load control device and may transmit a command to the load control device or the system controller to blink the lighting load.

Figure 13:
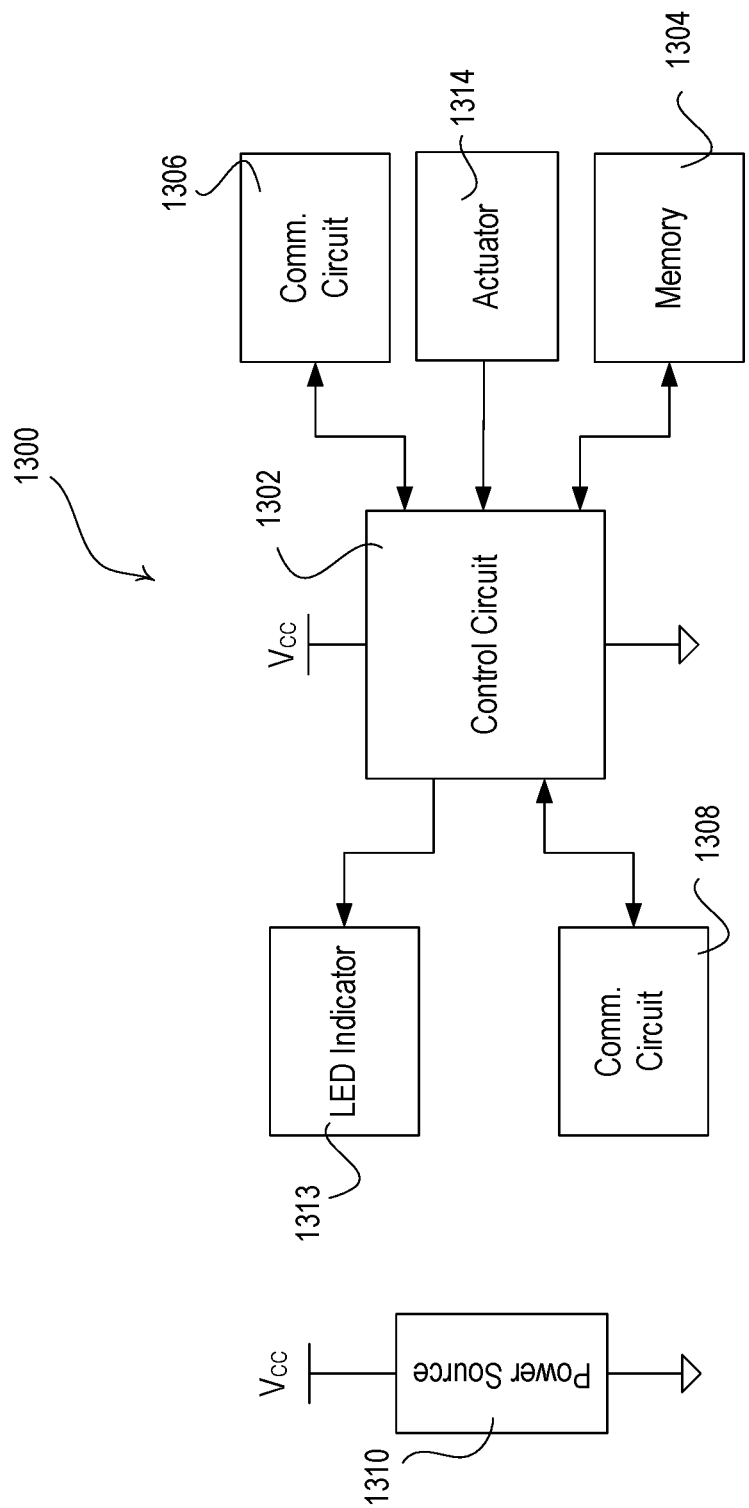
FIG. 13 is a block diagram of an example system controller.

FIG. 13 is a block diagram illustrating an example system controller 1300 (such as system controller 110 described herein). The system controller 1300 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1314). The control circuit 1314 may be configured to execute one or more software-based applications that include instructions that when executed by the control circuit may configure the control circuit to perform signal coding, data processing, power control, input/output processing, or any other functionality that enables the system controller 1300 to perform as described herein. One will recognize that features and processes described herein may also and/or alternatively be provided by firmware and/or hardware in addition to/as an alternative to software-based instructions. The control circuit 1314 may store information in and/or retrieve information from the memory 1320. Memory 1320 may also store software-based instructions for execution by the control circuit 1314 and may also provide an execution space as the control circuit executes instructions. Memory 1320 may be implemented as an external integrated circuit (IC) or as an internal circuit of the control circuit 1314. Memory 1320 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The system controller 1300 may include communications circuit 1306 for transmitting and/or receiving information. The communications circuit 1306 may perform wireless and/or wired communications. The system controller 1300 may also, or alternatively, include communication circuit 1308 for transmitting and/or receiving information. The communications circuit 1308 may perform wireless and/or wired communications. Communications circuits 1306 and 1308 may be in communication with control circuit 1302. The communications circuits 1306 and 1308 may include RF transceivers or other communications modules capable of performing wireless communications via an antenna. The communications circuit 1306 and communications circuit 1308 may be capable of performing communications via the same communication channels or different communication channels. For example, the communications circuit 1306 may be capable of communicating via a wireless communication channel (e.g., BLUETOOTH®, near field communication (NFC), WI-FIC), WI-MAX®, cellular, etc.) and the communications circuit 1308 may be capable of communicating (via another wireless communication channel (e.g., WI-FI® or a proprietary communication channel, such as CLEAR CONNECT™).

The control circuit 1302 may be in communication with an LED indicator 1313 for providing indications to a user. The control circuit 1302 may be in communication with an actuator 1314 (e.g., one or more buttons) that may be actuated by a user to communicate user selections to the control circuit 1302. For example, the actuator 1314 may be actuated to put the control circuit 1302 in an association mode and/or communicate association messages from the system controller 1300.

Each of the modules within the system controller 1300 may be powered by a power source 1310. The power source 1310 may include an AC power supply or DC power supply, for example. The power source 1310 may generate a supply voltage $V_{CC}$ for powering the modules within the system controller 1300.

Figure 14A:
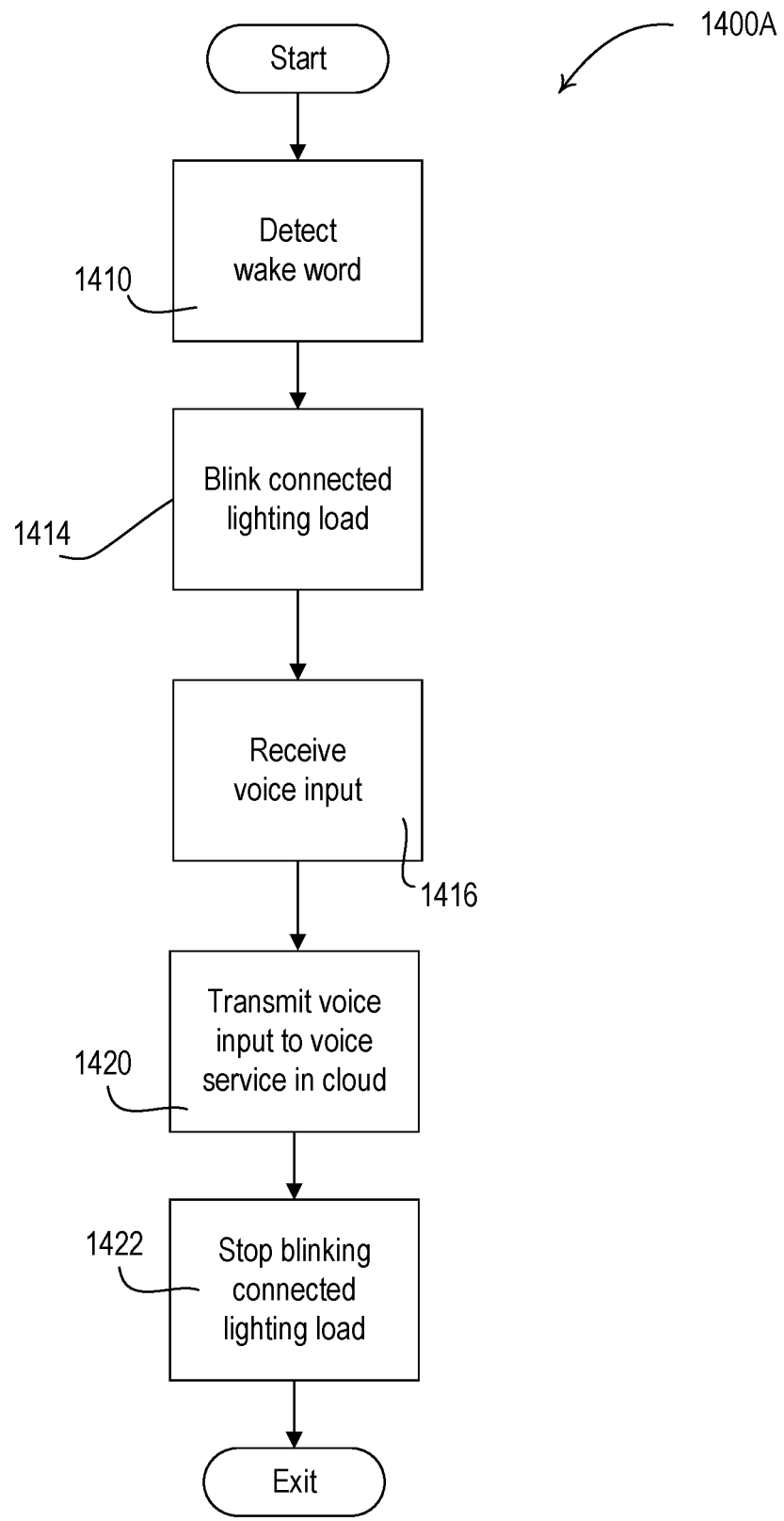
FIG. 14A is an example method by which a load control device may blink a lighting load when receiving voice input.

FIG. 14A is an example method 1400A that may be executed by a control circuit of a load control device in response to hearing a wake word. At step 1410, the load control device may detect a wake word. For example, a user may speak a wake word in proximity to the load control device, which may be received by one or more microphones of the load control device. A control circuit of the load control device may recognize the received audio data as the wake word. Upon recognizing the wake word, the load control device may blink the connected lighting load at step 1414. For example, the load control device may turn the lighting load on and off with a duty cycle that is easily visible to the human eye. For example, the load control device may turn the lighting load on and off every two seconds.

At step 1416, the audio device may receive voice input after the wake word and may transmit the voice input to a voice service in the cloud at step 1420. If the user does not want the device to transmit audio data, the blinking lights may alert a user to put the load control device into a mute mode. The mute mode may prevent the load control (or audio device) from recording acoustic data (i.e., recording voice inputs). The load control device may stop blinking the load at 1422.

Figure 14B:
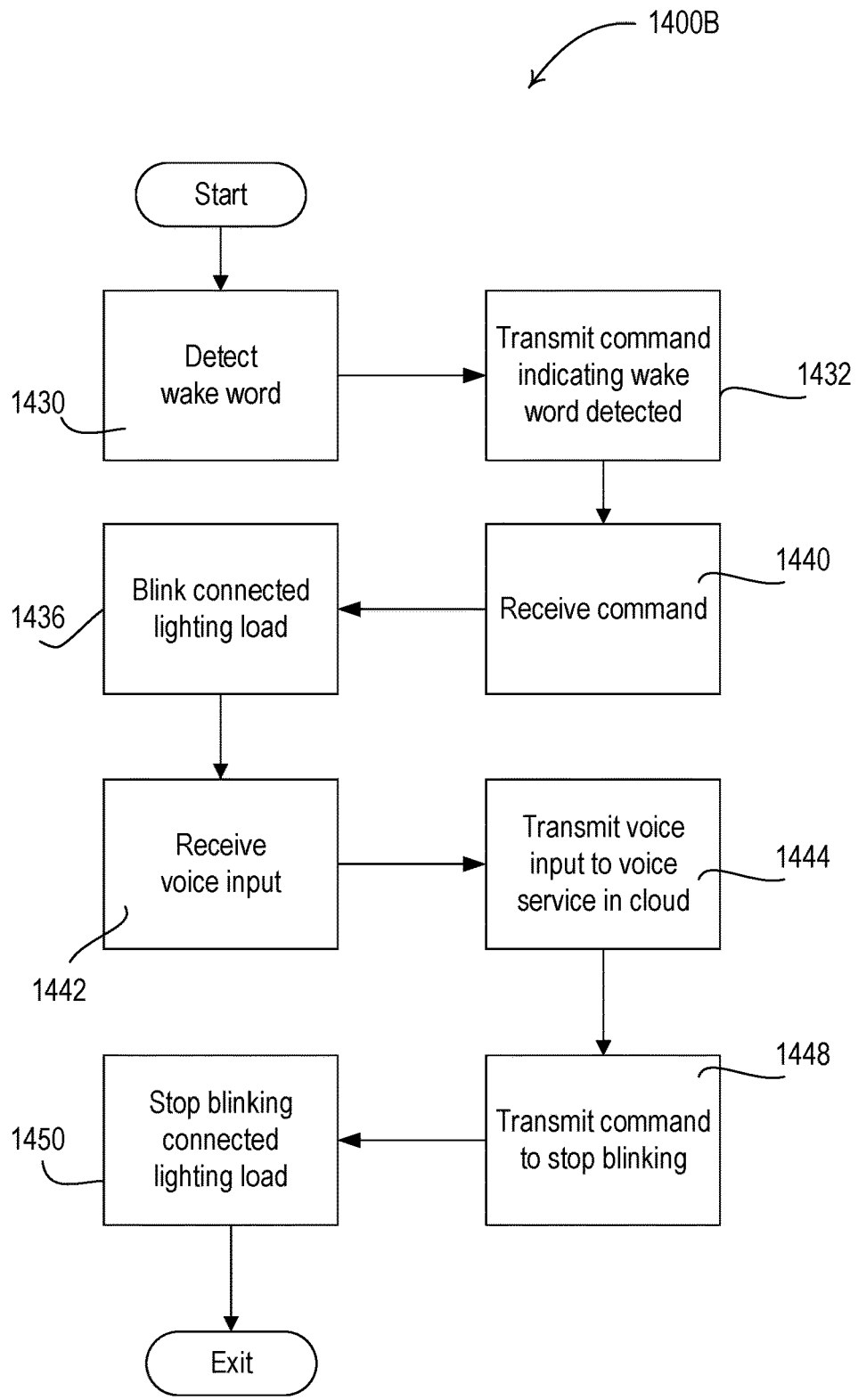
FIG. 14B is an example method by which a microphone device may communicate with a load control device to blink a lighting load when receiving voice input.

FIG. 14B is an example method 1400B, similar to 1400A, which may be executed by a microphone device which is not integrated with a load control device. The microphone device may detect a wake word at step 1430. At 1432, the microphone device may transmit a command indicating the wake word has been detected. For example, the microphone device may transmit a command to a control device and/or the system controller.

At step 1440, the load control device may receive the command. According to a first example, the load control device may receive the command from the microphone device. That is, the microphone device may transmit a command indicating the wake word has been detected. Based on system configuration information determined during setup of the load control system, the load control devices may know whether they are located in the same room as the microphone device. For example, the microphone device may transmit the command along with a location or device identifier, identifying the location or the specific microphone device that transmits the command. The load control device may only respond to the command if it is in the same room as the microphone device. Alternatively, according to a second example, the microphone device may transmit the wake word to the system controller, or may transmit a command indicating the wake word has been heard to the system controller. The system controller may then transmit a command to the load control device in the same room and/or zone as the microphone device which heard the wake word. The command may indicate to the control device that a wake word has been detected, or the command may be a load control command instructing the control device to blink its connected load. The control device may receive the command from the system controller.

In response to receiving the command, the control device may blink a connected lighting load at step 1436. For example, the control device and/or the system controller may know which room the microphone device is located in, such that only the load control device for the room in which the microphone device is in may respond. At step 1442, the microphone device may receive voice input following the wake word. The microphone device may transmit the voice input to a voice service in the cloud at step 1444. At 1448, the microphone device may transmit a command to the load control device (directly or through the system controller) to instruct the load control device to stop blinking the electrical load. At step 1450, the load control device may receive the command and stop blinking the connected lighting load.

Although it is described herein as blinking a lighting load, one will understand that other types of alerts are possible. In another example, the load control device may increase and decrease an intensity of the connected lighting load. Or, the lighting control device may change the color of the light. The load control device may blink the lighting load a single time, or a repeated number of times to indicate to a user that the wake word was detected and the load control device will begin transmitting audio data. According to another embodiment, the load control device may control an electrical load that is not a lighting load, for example, a fan, speaker, etc., and may actuate the load on and off to alert the user.

In another example, when a microphone device is a mute mode, the microphone device may still be responsive to the wake word, but may not process the audio input following the wake word. For example, the microphone device may receive a wake word while in mute mode and may blink one or more lighting loads (according to methods of FIG. 14A, B as previously described) to indicate to a user that the device is in a mute mode.

One will understand that although the embodiments described herein may be with respect to a load control device having a microphone, the microphone may be separate from the load control device. Additionally, the system controller may also be a load control device and/or may have one or more microphones.

In addition to what has been described herein, the methods and systems may also be implemented in a computer program(s), software, or firmware based instructions incorporated in one or more computer-readable media for execution by a control circuit(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A load control device for controlling an amount of power to an electrical load in a zone, the load control device comprising:
    a microphone for receiving voice commands;
    an occupancy sensor for detecting occupancy in the zone;
    at least one communication circuit;
    a controllably conductive device configured to control the amount of power to the electrical load; and
    a control circuit operably connected to the microphone, the at least one communication circuit, and the controllably conductive device, the control circuit configured to:
    receive a voice command via the microphone;
    determine, based on a signal from the occupancy sensor, whether the zone is occupied;
    based on determining that the zone is not occupied, do not transmit the voice command to a voice service;
    based on determining that the zone is occupied, transmit via the at least one communication circuit the voice command received via the microphone to a voice service;
    receive a response from the voice service;
    interpret the response to determine a command;
    interpret the response to determine whether the response comprises an indication of a zone;
    in response to determining that the response comprises the indication of the zone, determine whether the indication of the zone matches the zone in which the load control device is located;
    in response to determining that the indication of the zone matches the zone in which the load control device is located, control the controllably conductive device to control the amount of power to the electrical load in response to the command; and
    in response to determining that the indication of the zone does not match the zone in which the load control device is located, do not control the controllably conductive device in response to the command.

2. The load control device of claim 1, wherein the control circuit is further configured to:
    in response to determining that the response does not comprise the indication of the zone, control the controllably conductive device to control the amount of power to the electrical load in response to the command.

3. The load control device of claim 1, wherein the control circuit is further configured to:
    in response to determining that the response comprises the indication of the zone:
        communicate via the at least one communication circuit the command and the indication of the zone to a second load control device, wherein the second load control device is configured to determine whether the second load control device is located in the zone and to control an electrical load based on the command when located in the zone.

4. The load control device of claim 1, wherein the control circuit is further configured to:
    in response to determining that the response comprises the indication of the zone:
        determine another load control device located in the zone; and
        communicate via the at least one communication circuit the command to the another load control device based on the another load control device being determined to be located in the zone, wherein the another load control device is configured to control an electrical load based on the command.

5. The device of claim 1, wherein the control circuit is further configured to:
    receive via the at least one communication circuit from a second load control device a communication that the second load control device received the voice command;
    determine from the voice command received via the microphone and the communication received from the second load control device that the voice command received via the microphone is of a higher quality than the voice command received by the second load control device; and
    wherein to transmit the voice command to the voice service comprises to transmit the voice command to the voice service based at least in part on the determination.

6. The device of claim 5, wherein to determine that that the voice command received via the microphone is of a higher quality than the voice command received by the second load control device comprises to make the determination based on one or more of:
    a volume of the voice command received via the microphone and a volume of the voice command received by the second load control device;
    a signal-to-noise ratio of the voice command received via the microphone and a signal-to-interference ratio of the voice command received by the second load control device; and
    a multipath interference of the voice command received via the microphone and a multipath interference of the voice command received by the second load control device.

7. The device of claim 5, wherein the communication received from the second load control device comprises on one or more of:
    an indication of a volume of the voice command received by the second load control device;

an indication of a signal-to-noise ratio of the voice command received by the second load control device; and an indication of a multipath interference of the voice command received by the second load control device.

8. The load control device of claim 1, wherein the control circuit is further configured to:

in response to determining that the response does not comprise the indication of the zone:

control the controllably conductive device to control the amount of power to the electrical load in response to the command; and based at least in part on receiving the communication from the second load control device, communicate the command to the second load control device, wherein the second load control device is configured to control a second electrical load based on the command.

9. The load control device of claim 1, wherein the zone comprises a room in a building.

\* \* \* \* \*